United States Patent
Stribling

(10) Patent No.: US 9,912,721 B2
(45) Date of Patent: Mar. 6, 2018

(54) SYSTEMS AND METHODS FOR PROVIDING EVENT-RELATED VIDEO SHARING SERVICES

(71) Applicant: Robert Patton Stribling, Monroe, GA (US)

(72) Inventor: Robert Patton Stribling, Monroe, GA (US)

(73) Assignee: Highlight Broadcast Network, LLC, Monroe, GA (US)

( * ) Notice: Subject to any disclaimer, the term of this patent is extended or adjusted under 35 U.S.C. 154(b) by 0 days.

(21) Appl. No.: 14/323,342

(22) Filed: Jul. 3, 2014

(65) Prior Publication Data

US 2014/0313341 A1    Oct. 23, 2014

Related U.S. Application Data

(63) Continuation-in-part of application No. 13/107,674, filed on May 13, 2011.

(60) Provisional application No. 61/334,689, filed on May 14, 2010.

(51) Int. Cl.

| | | |
|---|---|---|
| H04N 7/00 | (2011.01) | |
| G11B 27/00 | (2006.01) | |
| H04L 29/08 | (2006.01) | |
| H04N 21/2743 | (2011.01) | |
| H04N 21/4788 | (2011.01) | |
| H04N 5/232 | (2006.01) | |

(52) U.S. Cl.
CPC ......... *H04L 67/02* (2013.01); *H04N 5/23206* (2013.01); *H04N 21/2743* (2013.01); *H04N 21/4788* (2013.01)

(58) Field of Classification Search
CPC ............. H04N 21/6118; H04N 17/00; H04N 21/6582; G06T 2207/20144; G06T 7/0081
USPC .......................... 348/157; 715/725; 382/173
See application file for complete search history.

(56) References Cited

U.S. PATENT DOCUMENTS

| | | | |
|---|---|---|---|
| 7,032,177 B2 | 4/2006 | Novak et al. | |
| 7,876,352 B2 * | 1/2011 | Martin | G06F 17/30247 348/143 |
| 8,443,276 B2 * | 5/2013 | O'Brien | G06F 17/30038 715/201 |
| 2003/0038892 A1 * | 2/2003 | Wang | H04N 5/222 348/461 |
| 2003/0122966 A1 | 7/2003 | Markman et al. | |

(Continued)

OTHER PUBLICATIONS

International Patent Application No. PCT/US2011/036522: International Search Report dated Oct. 19, 2011, 2 pages.

(Continued)

*Primary Examiner* — Tsion B Owens
(74) *Attorney, Agent, or Firm* — Barry E. Kaplan

(57) ABSTRACT

Systems and methods for providing sports-related video sharing services to subscribers to such services are disclosed. The systems and methods enable the capture and storage of video data corresponding to sporting events held at sports venues, and the communication of captured video data to subscribers or others for viewing. The systems and methods also enable subscribers to create video highlight reels, with or without annotations and/or music, from the captured video data, and to post, distribute, and/or communicate the video highlight reels for viewing by others.

20 Claims, 28 Drawing Sheets

(56) References Cited

U.S. PATENT DOCUMENTS

| | | | |
|---|---|---|---|
| 2004/0032495 A1* | 2/2004 | Ortiz | H04N 5/232 348/157 |
| 2008/0247726 A1* | 10/2008 | Lee | G11B 27/036 386/282 |
| 2009/0282337 A1* | 11/2009 | Tilley | G06F 17/30781 715/719 |
| 2010/0031149 A1 | 2/2010 | Gentile et al. | |
| 2010/0324919 A1* | 12/2010 | Shore | G11B 27/034 705/1.1 |
| 2011/0202967 A1* | 8/2011 | Hecht et al. | 725/114 |
| 2011/0212756 A1 | 9/2011 | Packard et al. | |
| 2012/0011442 A1* | 1/2012 | Fay | G11B 27/034 715/723 |
| 2012/0311624 A1 | 12/2012 | Oskolkov et al. | |

OTHER PUBLICATIONS

Zhai et al., "eSports: Collaborative and Synchronous Video Annotation System in Grid Computing Environment", Proceedings of the Seventh IEEE International Symposium on Multimedia, ISM'05, Dec. 2005, 9 pages.

International Patent Application PCT/US2015/038977, "International Search Report", dated Nov. 24, 2015, 4 pages.

International Patent Application PCT/US2015/038977, "Written Opinion of the International Searching Authority", dated Nov. 24, 2015, 6 pages.

* cited by examiner

*FIG. 22E*  *FIG. 22F*

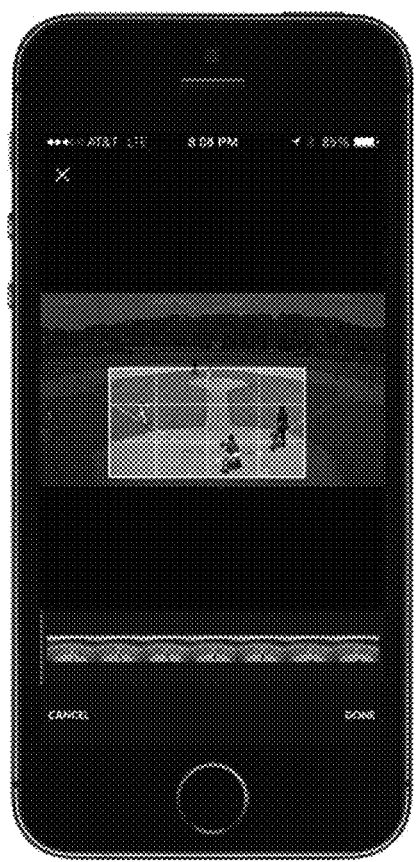 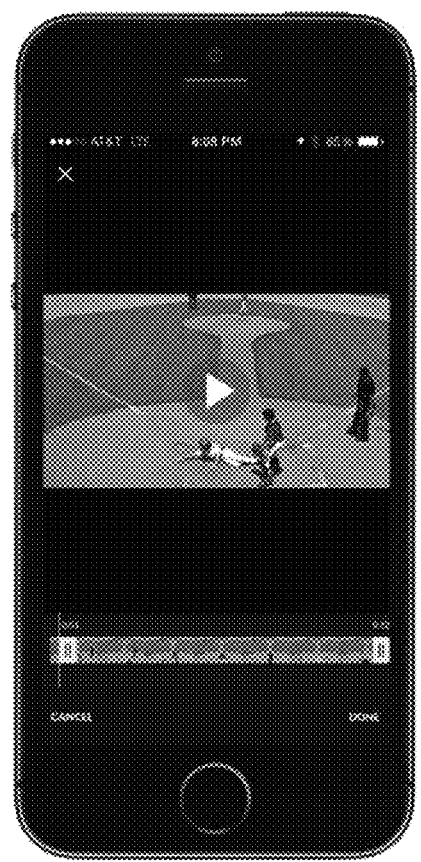
*FIG. 22I*   *FIG. 22J*

SYSTEMS AND METHODS FOR PROVIDING EVENT-RELATED VIDEO SHARING SERVICES

CROSS-REFERENCE TO RELATED APPLICATIONS

The present application is a continuation-in-part of U.S. patent application Ser. No. 13/107,674, filed on May 13, 2011; which claimed priority to U.S. provisional patent application Ser. No. 61/334,689, filed on May 14, 2010; both of which were entitled, "Systems and Methods for Providing Event-Related Video Sharing Services;" and both of which are incorporated in their entireties herein by reference.

TECHNICAL FIELD

The present disclosure relates, generally, to the field of video sharing services, including systems and methods for the capture, editing, and sharing of video data related to sports events.

BACKGROUND

The popularity of sports and sporting events has grown tremendously in recent years. While much of the interest in sports has been at the college and professional levels where many of the sporting events are televised around the world, there has also been substantial growth in the popularity of sports in which the participants are of high school or pre-high school age.

Unfortunately, most of the sporting events involving junior college, high school or pre-high school age are not televised and can only be viewed by those individuals who are able to attend them in person. Thus, for example, when a father is out of town on a business trip and cannot be present at his daughter's high school volleyball game, he must watch the game on video when he returns home from his trip in order to view his daughter playing in the game. Similarly, a college football scout cannot attend all of the numerous junior college and high school football games played around the country on a particular night involving players who might be candidates for a football scholarship to the college with which the scout is affiliated. To observe and evaluate such players, the college must obtain videos of the games and then the scout must watch numerous hours of video in order to identify and view particular plays involving players of interest.

Therefore, there is a need in the industry for systems and methods for providing sports-related video sharing services, and that may address other problems, difficulties, and/or shortcomings of current technology that may or may not be described herein.

SUMMARY

Broadly described are systems and methods for providing event-related, such as sporting events, video sharing services to subscribers to such services. The systems and methods enable the capture and storage of video data corresponding to sporting events held at sports venues, and the communication of captured video data to subscribers, users, or others for viewing at any time.

In some embodiments, the systems and methods may enable subscribers to create video highlight reels, with or without annotations and/or music, from the captured video data, to post the video highlight "reels" on, for example, web pages hosted by the system, and to communicate the video highlight reels for viewing by others.

In some embodiments, the systems and methods may enable users to download captured video data; to create edited video highlight reels, with or without annotations and/or music, from the captured video data; to save the video highlight reels to a local device; to post the video highlight reels to any of a variety of third-party hosted web pages, portals, services, channels, and/or the like; and/or to communicate the video highlight reels for viewing by others via any of a variety of social media channels and/or outlets, and/or via text, email, and/or the like.

These and other features and advantages of the various embodiments of devices and related systems comprising, as set forth within the present disclosure, will become more apparent to those of ordinary skill in the art after reading the following Detailed Description of Illustrative Embodiments and the Claims in light of the accompanying drawing Figures.

BRIEF DESCRIPTION OF THE DRAWINGS

Accordingly, the within disclosure will be best understood through consideration of, and with reference to, the following drawing Figures, viewed in conjunction with the Detailed Description of Illustrative Embodiments referring thereto, in which like reference numbers throughout the various Figures designate like structure, and in which:

FIG. 22E depicts a subscriber mobile device running an application configured to interoperate with the sports-related video sharing system in accordance with an embodiment of the present disclosure, and further depicting a representative venue screen thereof;

FIG. 22F depicts a subscriber mobile device running an application configured to interoperate with the sports-related video sharing system in accordance with an embodiment of the present disclosure, and further depicting a representative clips screen thereof;

FIG. 22I depicts a subscriber mobile device running an application configured to interoperate with the sports-related video sharing system in accordance with an embodiment of the present disclosure, and further depicting a representative zoom edit screen thereof;

FIG. 22J depicts a subscriber mobile device running an application configured to interoperate with the sports-related video sharing system in accordance with an embodiment of the present disclosure, and further depicting a representative trim edit screen thereof;

It is to be noted that the drawings presented are intended solely for the purpose of illustration and that they are, therefore, neither desired nor intended to limit any inventive aspect to any or all of the exact details shown herein, except insofar as they may be deemed essential to a particular claim.

DETAILED DESCRIPTION OF ILLUSTRATIVE EMBODIMENTS

In describing the several embodiments illustrated in the Figures, specific terminology is employed for the sake of clarity. It is not intended, however, that any inventive aspect be limited to the specific terminology so selected, and it is to be understood that each specific element includes all technical equivalents that operate in a similar manner to accomplish a similar purpose.

Figure 1:
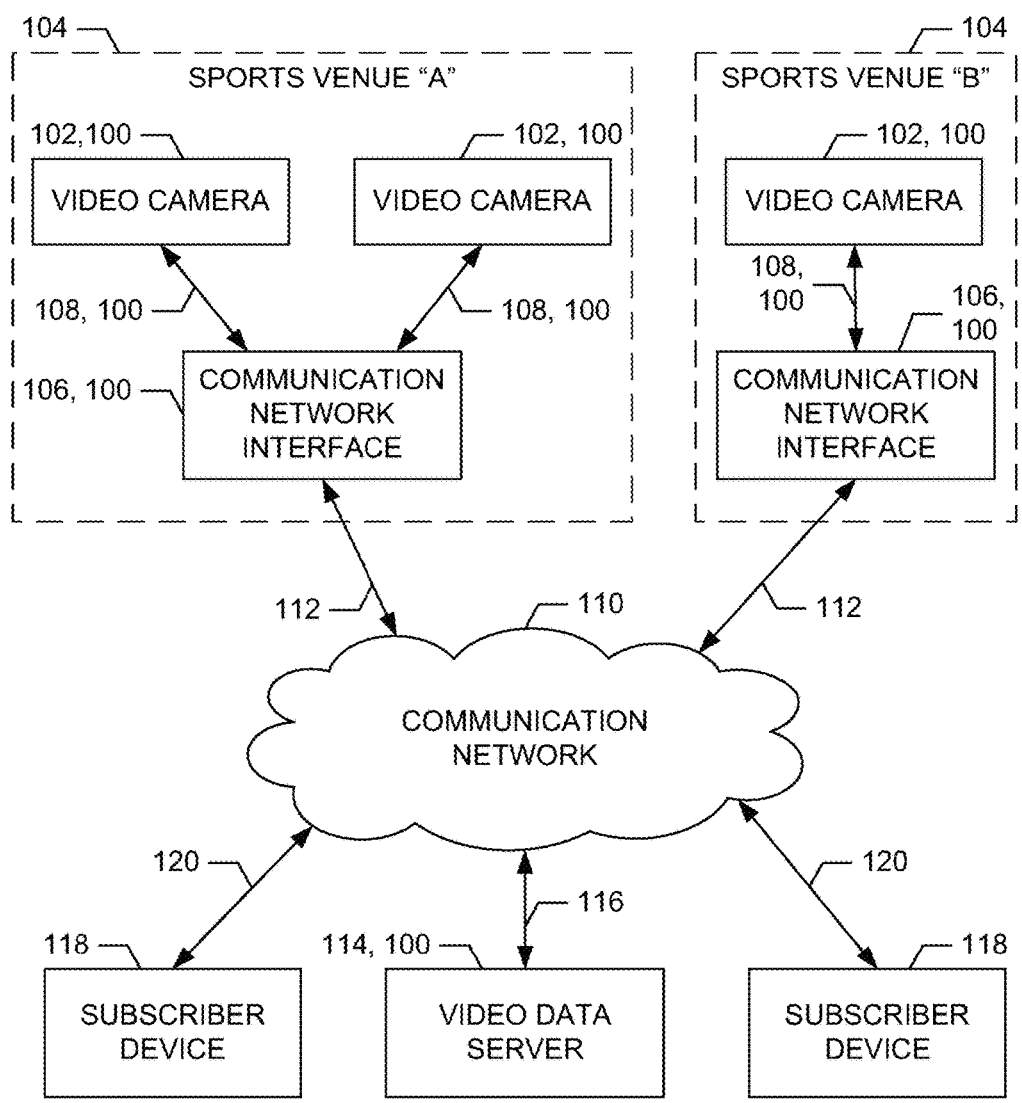
FIG. 1 displays a block diagram representation of a sports-related video sharing system in accordance with an embodiment of the present disclosure.

Referring now to the drawings in which like numerals represent like elements or steps throughout the several views, FIG. 1 displays a block diagram representation of a sports-related video sharing system 100 and environment therefor. However, the present disclosure is not limited to sporting events. Rather, the present disclosure is directed to any event. An event is defined to include any activity or occurrence of social or personal importance.

In some embodiments, sports-related video sharing system 100 (also sometimes referred to herein as "system 100") provides video sharing services for sporting events to subscribers who may pay a subscription fee to the system's owner/operator for use of the video sharing services. In other embodiments, sports-related video sharing system 100 provides video sharing services for sporting events to subscribers who may not directly or indirectly pay a subscription or other fee to the system's owner/operator for use of the video sharing services. In such embodiments, the terms "subscriber" or "subscribers," as used herein, should be understood to include any person or entity—whether a natural person, organization, automated service (agent, bot, or the like), or otherwise—accessing and using the video sharing system of the present disclosure in accordance with its intended purposes, and without regard to whether a fee is paid, directly or indirectly, by said person or entity. Accordingly, the terms, "subscriber" and/or "subscribers," are used herein to indicate and include any of a broad variety of users of the video sharing services described within the present disclosure, wherein financial remuneration may be provided to the system's owner/operator by virtue of, for example, third-party sponsorships, advertising revenues, impression payments, product tie-ins, and the like, without limitation, or not at all.

The sporting events include, but are not limited to, football, basketball, baseball, soccer, hockey, gymnastics, wrestling, swimming, diving, cycling, golf, skiing, cricket, and track/field games or matches at levels of competition such as high school, college, amateur, semi-professional, and professional. As described above, the subscribers for the video sharing services may include a wide variety of individuals and business entities, including for example and not limitation, athletes, parents of athletes, booster club participants, coaches, scouts, fans, high schools, colleges, professional sports teams, television stations and other news outlets, and others.

In subscription-based embodiments, the subscription fee can comprise, but is not limited to, an annual subscription fee, a monthly subscription fee, a season subscription fee, a single use subscription fee, or a combination thereof. In embodiments wherein financial remuneration is made by virtue of, for example, third-party sponsorships, advertising revenues, impression payments, product tie-ins, and the like, financial remuneration may comprise and/or be tied to fees based upon, for example, a per view, per use, per click, per link, per impression, per message, per banner, and/or like schema, or a combination thereof.

In operation, system 100 captures and stores video data corresponding to sporting events at one or more sports venues whose owners/operators have agreed to permit video cameras to be installed at the venues in exchange for some consideration, such as, for example, a portion of the subscription or other fees paid by subscribers and/or other third-parties, or other agreed-upon consideration, such as advertising, referrals, sponsorship recognition, and/or the like, without limitation. Subsequently, system 100 provides subscribers with access to the stored video data via a communication network such as, but not limited to, the Internet and enables subscribers to view the video data for selected sporting events of interest to the subscribers.

System 100 also enables subscribers to create video highlight "reels." It will be appreciated that the terms, "reel" or "reels," are used principally as a metaphor for the historic term; however, it will be recognized that these terms, as well as the term, "video data," are intended within the present disclosure to refer to any series of analog and/or digital images, whether consecutive or not, such as may be: streamed, captured, recorded, sequenced, and/or the like; held, stored, and/or archived by volatile and/or non-volatile storage devices, media, and/or the like; transmitted, communicated, and/or distributed to others, whether in compressed or uncompressed forms, formats, and/or containers, via media, electronic transmission and/or carrier systems, and the like; whether now known or to be developed hereafter. In some embodiments, video data and video highlight reels may comprise videographic data, which may be shortened and/or truncated into what are commonly referred to as video clips, typically encoded and decoded, compressed and decompressed, and held within common container formats such as, but not limited to, .avi, .mp4, .mov, .flv, .ogg, .ogm, .ogv, .vob, .asf, .wmv, and/or the like.

Accordingly, subscribers may create video highlight reels, including video data for selected plays from the sporting events, and annotate the video data of the highlight reels with comments or other information. Additionally, system 100 enables subscribers to send the video highlight reels or links thereto, via the communication network, to others who may be interested in viewing the video highlight reels. For example, using this latter feature, athletes can create video highlight reels comprising a compilation of plays from many sporting events in which they have participated for submission to college and/or professional coaches and/or scouts to aid the coaches and/or scouts with their recruiting efforts. In another example, athletes can create a similar video highlight reel for a particular sporting event so that a parent can view the video highlight reel at a later time. In addition, system 100 can display advertisements, messages, and/or other communications, via the system's user interfaces from advertisers or others who have paid an advertising fee, or who may have provided other consideration, to the system's owner/operator for such advertising and/or other access to a system subscriber.

System 100, as displayed in FIG. 1, which is and in accordance with an aspect of the present disclosure, comprises one or more video cameras 102 located at each sports venue 104. Each video camera 102 is configured to capture video data corresponding to a sporting event ongoing at sporting venue 104 at which video camera 102 is located. Optionally, some video cameras 102 can be remotely controlled and/or be responsive to motion so that plays of a sporting event can be tracked by video camera 102. Other video cameras 102, optionally, can also have the ability to zoom in or out so as to provide close ups of athletes or of portions of plays.

Each video camera 102 is also configured to output the captured video data corresponding to a sporting event to communication network interface 106 of system 100 via bi-directional communication link 108. Generally, communication network interface 106 is located at each sports venue 104 and is connected to communication network 110 by a bidirectional communication link 112. Each communication network interface 106 is adapted to receive captured video data from one or more video cameras 102 located at sports venue 104 and to communicate the captured video data to communication network 110. Each communication network interface 106 can also be adapted to receive commands from one or more video data server 114, described below, via communication network 110 and bi-directional communication link 112, and to act in response to the received commands or to communicate the received commands, as need be, to appropriate video cameras 102 over one or more appropriate bi-directional communication links 108. Such commands can include directions to start/stop capturing video data, to move video camera 102 to point in a different direction, to zoom in/out video camera 102, and to communicate and/or stream captured video data.

Communication network 110 is adapted to bi-directionally communicate captured video data, commands, replies to commands, messages, and other data and/or information. In accordance with an aspect of the present disclosure, communication network 110 comprises communication facilities and infrastructure commonly referred to as the Internet. However, in other embodiments, communication network 110 can comprise other communication facilities and infrastructure having similar capabilities.

System 100 further comprises one or more video data servers 114 that are communicatively connected to communication network 110 by bi-directional communication links 116 and, hence, to video cameras 102 additionally by appropriate communication network interfaces 106 and bi-directional communication links 108, 112. Video data servers 114 are also communicatively connected to subscriber devices 118 via communication network 110 and bi-directional communication links 116, 120. Video data servers 114 are configured to control operation of video cameras 102 located at sports venues 104, to receive captured video data corresponding to sporting events from video cameras 102, and/or to communicate the captured video data to subscriber devices 118 for viewing. Video data servers 114 are also configured with computer software appropriate for the creation of video highlight reels from the captured video data in response to inputs made by and received from subscribers via subscribers' devices 118. The computer software is also appropriate for adding textual or graphic annotations, voice commentary, and/or music to the video highlight reels as desired by subscribers. Additionally, video data servers 114 are configured to host subscribers' web pages and to post video highlight reels on subscribers' web pages for selection. In addition, video data servers 114 are configured to communicate video data corresponding to video highlight reels to subscriber devices 118 for viewing, and/or to other devices and/or video sharing service providers such as, for example and not limitation, the popular video sharing service provider known as "YOUTUBE," whether or not hosted by such video sharing service provider and/or its respective systems.

Generally, subscriber devices 118 include personal computers and other micro-processor enabled devices, such as smart phones, pad and/or tablet—type computers, and the like, regardless of base operating system and/or other operating configuration, that are equipped with browser or application-specific computer software that enables subscriber devices 118 to establish a communication session with video data server 114 for the viewing of captured video data, editing of captured video data to create video highlight reels, viewing of highlight reels, and causing the communication of video highlight reels or links thereto to other devices. It should be appreciated, however, that subscriber devices 118 can include other devices that are equipped with browser or application-specific computer software having lesser capabilities or that are not equipped with browser computer software at all. In some of such cases, subscriber devices 118 can be limited to only receiving and viewing video highlight reels that are received by subscriber devices 118 as, for example, attachments to electronic mail, social media outlets, or the like, without limitation.

Figure 2A:
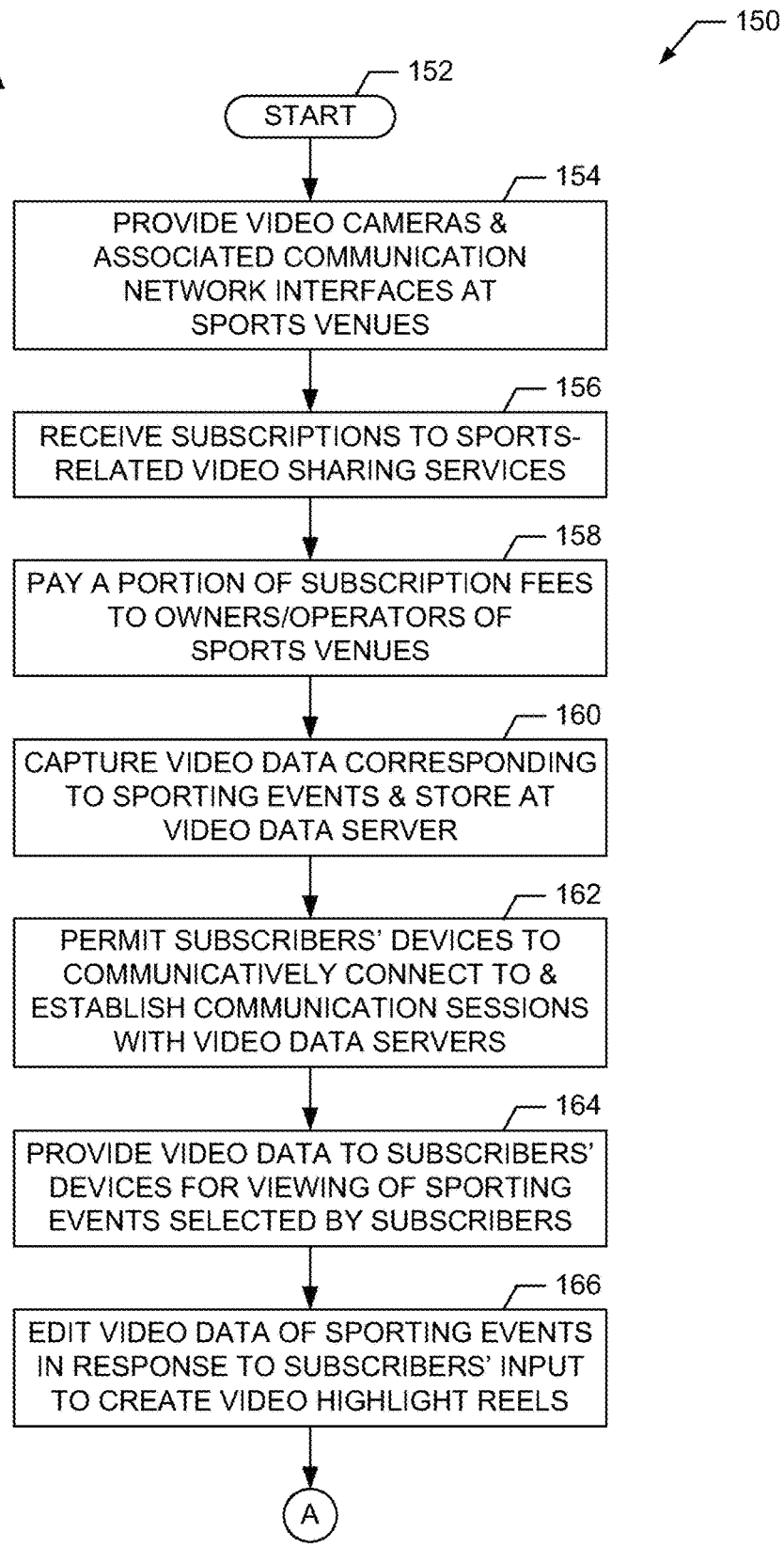
FIGS. 2A-2B display a flowchart representation of a method of establishing and operating the sports-related video sharing system in accordance with an embodiment of the present disclosure.
Figure 2B:
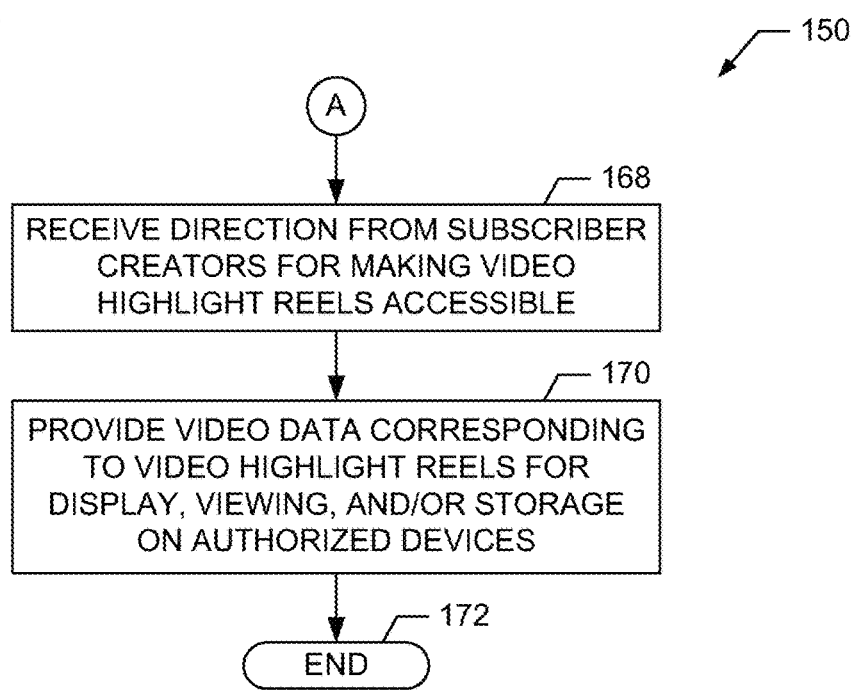

FIG. 2 displays a flowchart representation of method 150 of establishing and operating a sports-related video sharing system 100 in accordance with the present disclosure. After method 150 starts at step 152, system 100 provides video cameras 102 and associated communication network interfaces 106 at step 154 that are installed at sports venues Continuing at step 160, system 100 uses video cameras 102 to capture video data corresponding to the sporting events held at the sports venues and stores the captured video data at one or more video data servers 114. Then, at step 162, system 100 permits subscribers' devices 118 to communicatively connect to video data server 114 and establish a communication session with video data server 114. Advancing to step 164 and in response to received subscriber input identifying sporting events desired for viewing, system 100 provides or communicates captured video data corresponding to sporting events to subscribers' devices 118 for display and viewing thereon. Subsequently, at step 166, system 100 edits captured video data corresponding to sporting events in response to subscriber input to create video highlight reels.

At step 168, system 100 receives direction from subscriber creators of video highlight reels for making the video highlight reels accessible to other subscribers and/or other parties. For example and not limitation, such direction can include posting a video highlight reel on a subscriber's web page for selection and viewing by other subscribers. In further example, such direction can include information identifying other subscribers who can view the video highlight reels. In still further example, such direction can include information instructing system 100 to attach a video highlight reel, or link thereto, to an electronic mail, social media communication, third-party sharing service resource, and/or the like, without limitation, and to send the electronic mail, social media communication, or third-party sharing service resource, with attached video highlight reel or link, to a party identified by an input electronic mail or other address. Proceeding to step 170, system 100 provides video data corresponding to video highlight reels to authorized subscribers' devices or other devices, as directed, for display, viewing, and/or storage. After providing the video data corresponding to video highlight reels, system 100 ends operation according to method 150 at step 172 thereof.

It will be recognized that, in some embodiments of system 100, a user may be permitted to upload to system 100 authorized video content such as may be recorded by personal or third party cameras, wherein said video subsequently may be stored, edited, processed, and distributed by system 100 in accordance with steps 162 and following.

Figure 3:
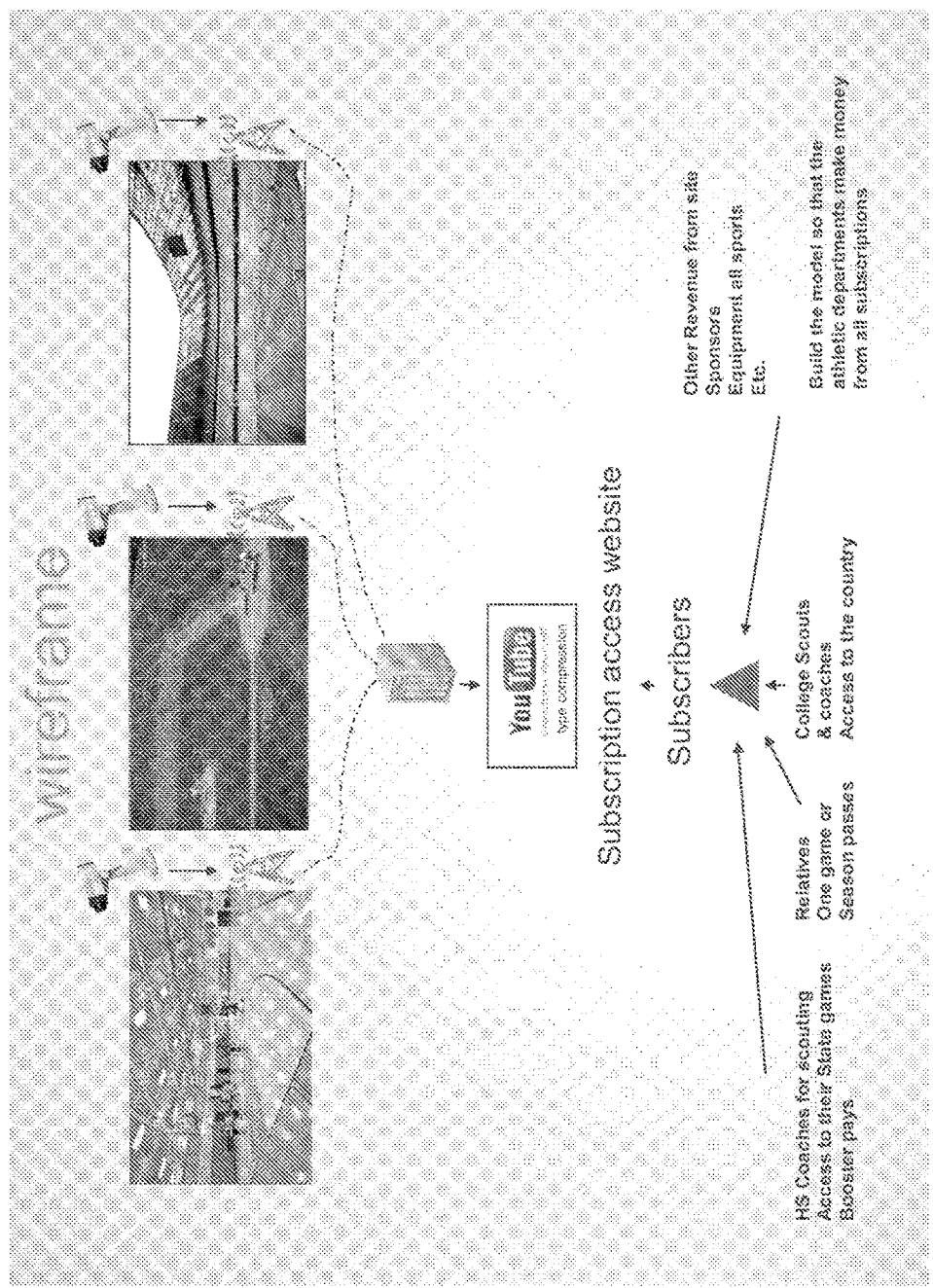
FIG. 3 displays a pictorial representation of the sports-related video sharing system in accordance with an embodiment of the present disclosure.
Figure 4:
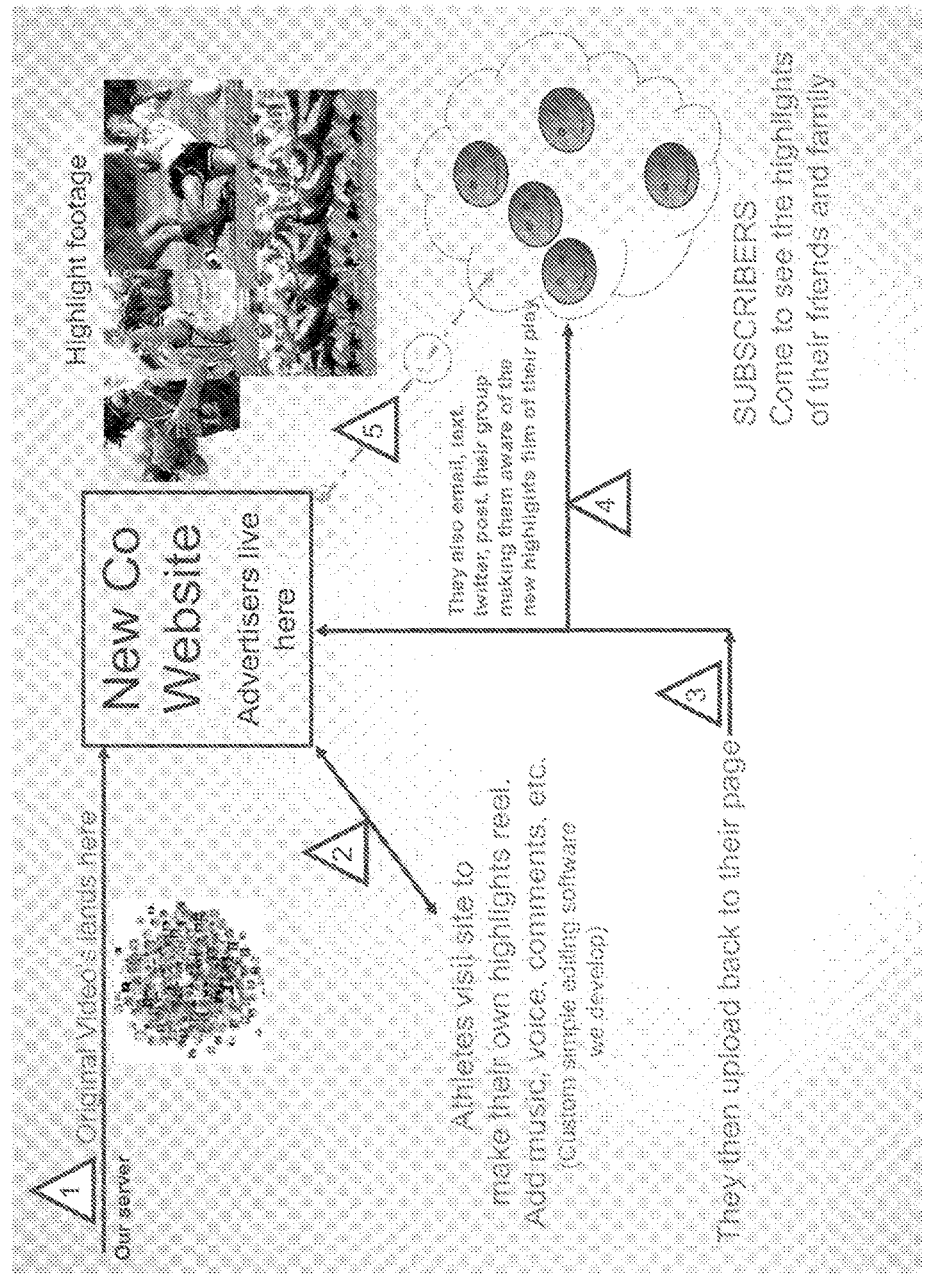
FIG. 4 displays a pictorial representation of portions of the method of establishing and operating the sports-related video sharing system in accordance with an embodiment of the present disclosure.
Figure 5:
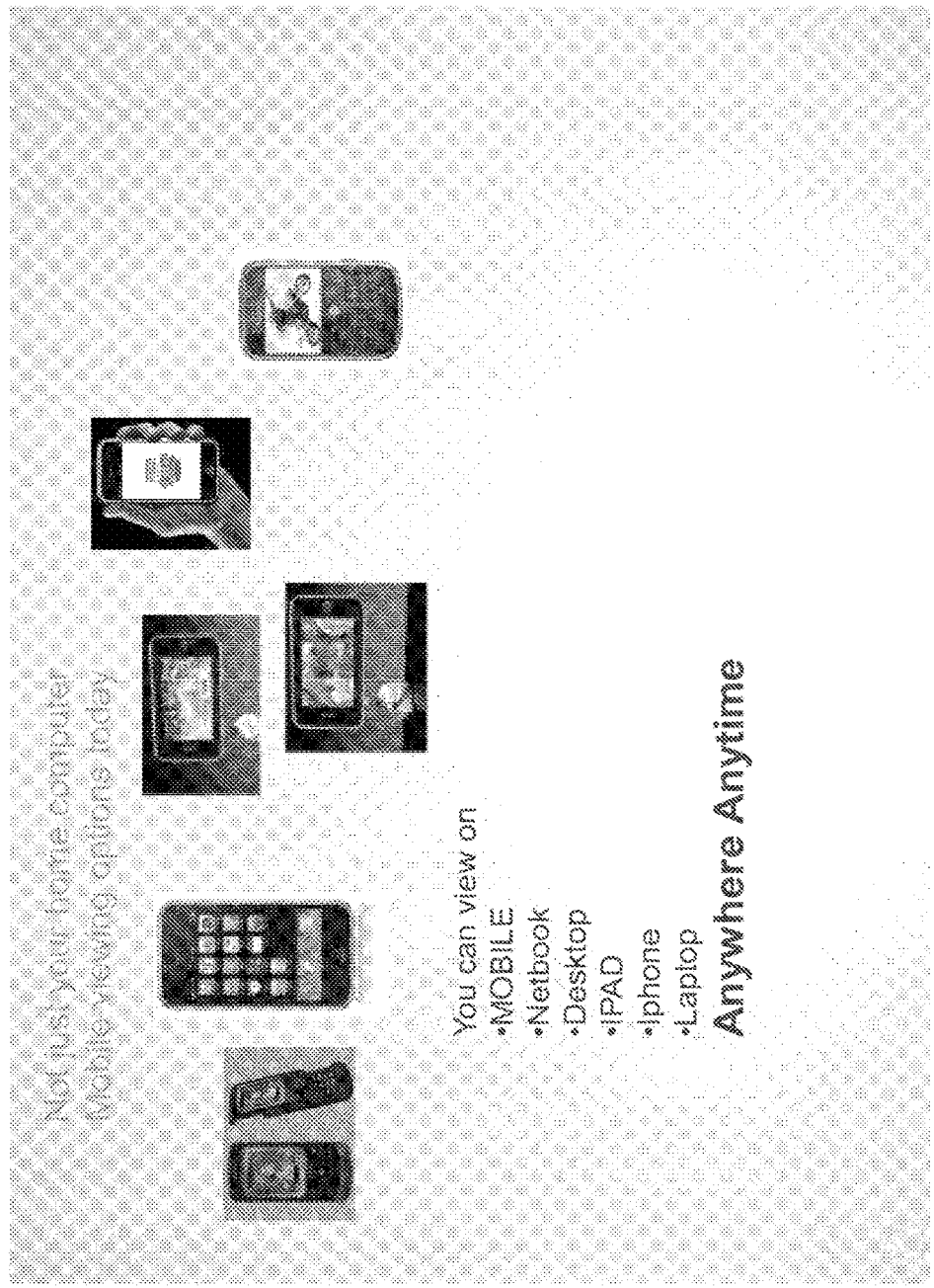
FIG. 5 displays a pictorial representation of some devices on which a subscriber may view captured video data and/or video highlight reels provided by the sports-related video sharing system in accordance with an embodiment of the present disclosure.

FIGS. 3, 4 and 5 display and provide additional descriptive information pertaining to the systems and methods for providing sports-related video sharing services in the form of pictorial representations.

It will be recognized that system 100 may provide ancillary and/or additional functionality, such as the ability to store and deliver player-based instructional content; inter-user communication functionality, such as chat or blog areas; Really Simple Syndication ("RSS") feeds; fan portals; a user "locker room" comprising user-specific data, advertising, and content; a system for aggregating user-points earned with sponsors; and the like.

It will also be recognized that any of the variety of storage devices, video servers, video processing components, network components, servers, computers, and the like, as are described herein, or as may otherwise be known or developed in the art for purposes suited to one or more of the uses and/or functions described herein, may be configured and located according to any of a variety of operational and/or infrastructure configurations well-known in the art. For example, computer hardware, network components, storage devices, editing and processing software and devices, and the like, may be physically located at a provider or host location, at a sport venue, in a virtualized (e.g., "cloud-based" or remote network) environment, and the like; they may be configured to share or extend one or more functions described herein according to system, network, or software-defined criteria; and they may be scaled to accommodate system, network, data, or user load variations, to provide additional data storage and processing capabilities, to provide extended network functionality, and the like.

Returning now to the several drawing figures, certain additional, illustrative embodiments are next described. With regard to such additional, illustrative embodiments, it will be understood that one or more of the several teachings, features, attributes, characteristics, functions, capabilities, purposes, benefits, advantages, disclosures, and/or the like, set forth hereinabove with respect to FIGS. 1-5 may be incorporated into, combined with, extended to, configured to co-operably function with, and/or the like, each said embodiment.

Accordingly, in the embodiments of sports-related video sharing system 200 (also sometimes referred to herein as "system 200"), various principal attributes of which are depicted in FIGS. 6-21, certain desirable aspects of the functionality described hereinabove with regard to FIGS. 1-5 can be extended to allow mobile subscribers the ability to edit and share sports related reels and videographic content, such as has been previously described, through social media and like platforms in near real-time.

In such embodiments, mobile subscribers may be a category of subscribers using portable or mobile micro-processor enabled devices, such as smart phones, tablet computers, and the like, regardless of base operating system and/or other operating configuration, that are equipped with browser or application-specific computer software, often commonly called "applications" or "apps," which, in accordance with the subject matter of the present disclosure, enable mobile subscriber devices to establish a communication session with a video data server for the viewing of captured video data, editing of captured video data on the mobile device, and creating video highlight reels, viewing of highlight reels, and causing the shared communication of video highlight reels, or links thereto, to other consumers, subscribers, online services, social media outlets, devices, and/or the like.

Generally described, through relationships with venue owners and/or operators, as was described in greater detail above, videographic camera systems are installed at sports venues of such types as have been previously described. Such camera systems are configured to upload mobile-ready video clips in near real-time cycles. Mobile subscribers are enabled to browse, download, edit, review, and share selected video clips, highlight reels, and the like. It will be appreciated that mobile-ready video clips, highlight reels, and the like, are configured so as to be optimized for download, storage, manipulation, transmission, and the like, by a mobile device, such as through use of appropriate and often industry-standard data compression algorithms, data formats, codecs, containers, transmission protocols, and the like, of such types as are best suited for a given mobile computing environment and infrastructure.

Advantageously, with such system architecture, a relatively high level subscriber experience can be achieved, while limiting unnecessary bandwidth, hardware costs, data storage costs, and other infrastructure costs. Further, due to the ever-increasing availability of cross-platform functionality and coding models within relevant mobile device markets and product categories, desirable functionality may be leveraged across mobile devices, mobile system architectures, mobile platforms, and product categories.

Figure 6:
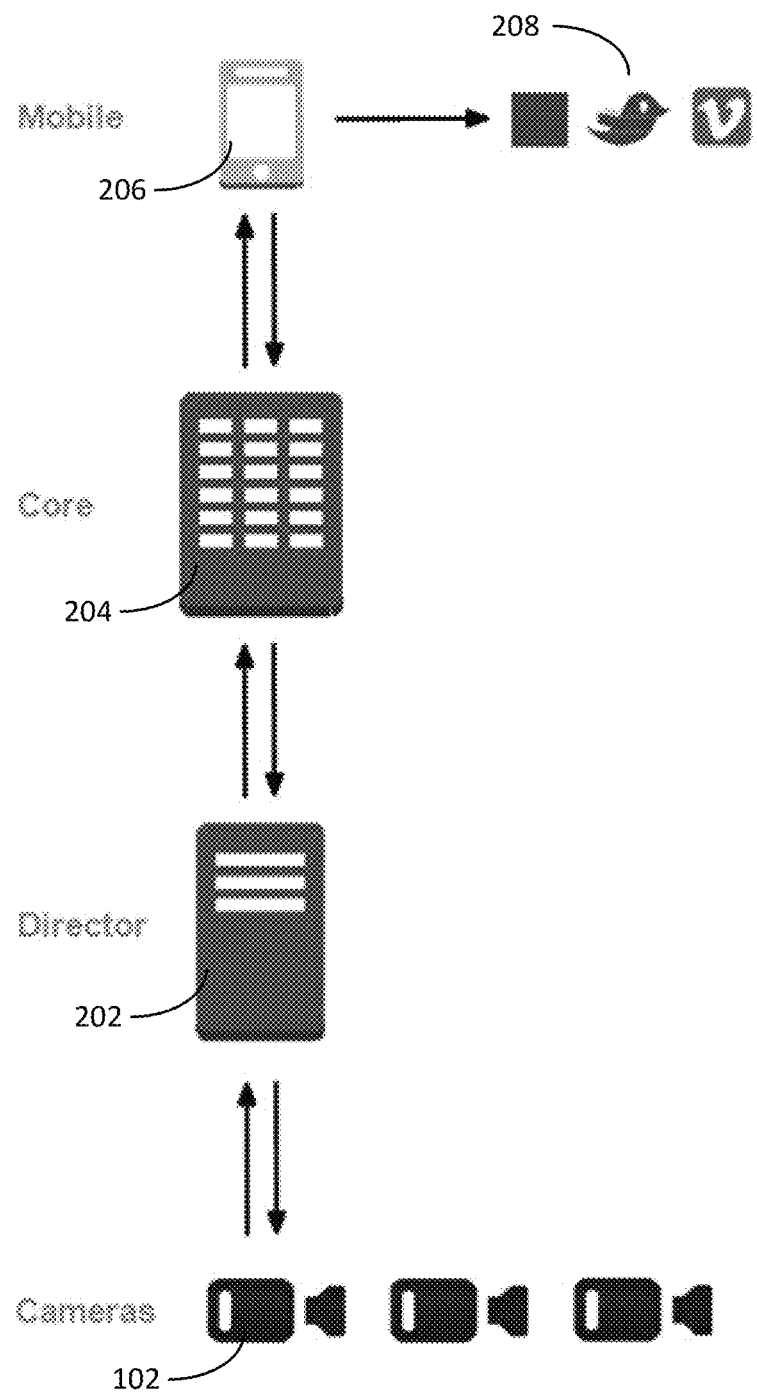
FIG. 6 depicts interaction of a director, core, video camera, subscriber mobile device, and social media channels and/or outlets, as provided by the sports-related video sharing system in accordance with an embodiment of the present disclosure.

Turning now to FIG. 6, director 202 is installed at a sporting venue, such as venue 104. Director 202 may be embodied within a software architecture, embedded within the firmware and/or architecture of a hardware device, and combinations thereof. Director 202 may be interconnected with one or more video cameras, such as video camera 102. Video camera 102 is, in some embodiments, a digital video camera, as contrasted with an analog video camera, although it will be recognized by one of ordinary skill in the art that either type can be configured to work within system 200. In some embodiments, director 202 may be connected with a plurality of cameras 102, such as in the embodiment of FIG. 6 wherein three cameras 102 are depicted.

Director 202 is configured to control cameras 102 for purposes of recording mobile device-suitable compressed video streams in, or spanning, predefined time intervals. In some embodiments, such predefined time intervals may comprise one minute intervals; however, it will be apparent that other and/or differing intervals may be specified so as to suit a particular need, use case, preferred configuration, and/or the like. Recording through each predefined time interval defines a video clip 203 of a duration corresponding to the predefined time interval.

Each duration-defined video clip 203 is saved to a local, typically rewriteable, memory. Such local memory may comprise that which resides on-board video camera 102, or it may comprise memory within or associated with director 202, or it may comprise memory that is external to video camera 102 and/or director 202. As each video clip 203 is saved, director 202 uploads or otherwise transmits a copy of the clip to core 204, after which the copy resident in local memory is removed. Core 204 stores each defined video clip 203.

Optionally, video clips on either and/or both director 202 and core 204 may be stored for a pre-defined period of time, such as forty-eight hours, before being deleted.

Core 204 creates a low-bandwidth optimized "preview" version and thumbnail image, and marks the clip as "active" for viewing on a subscriber's suitably configured mobile device 206. In some embodiments, a subscriber will pre-configure her mobile device 206 with an application, or "app," appropriately downloaded, installed, and configured according to the technical, procedural, and institutional requirements of the subscriber's relevant mobile platform. In other embodiments, a subscriber may access and view the clip on a browser application, or "app," residing on her mobile device 206 and configured to communicate with system 200, as via conventional hypertext markup language ("html"), java script, flash, or other suitable computer language, system architecture, communication protocol, and/or the like, all as are well-known in the relevant art.

Subscribers are able to browse active video clips 203. In some embodiments, each clip initially is shown in "preview"

version, so as to minimize, for example, bandwidth, data storage, and micro-processor related requirements. Once a clip is selected for editing, the full mobile version is downloaded to the subscriber's mobile device 206. The subscriber may then edit video clip 203, to create, for example, a video highlight reel, of a form, nature, and configuration such as was described above; and, subsequently, the subscriber may choose to share edited video clip 203 or video highlight reel with others via any of a variety of social media channels 208. Alternatively, or in addition, the subscriber may choose to save edited video clip 203 or video highlight reel to a local camera roll, gallery, or other memory and/or storage facility residing within or upon mobile device 206. Still alternatively, or in addition, the subscriber may choose to save edited video clip 203 or video highlight reel to an external storage facility, such as, but not limited to, any of a variety of cloud-based, network-based, or other storage solutions as are well-known in the relevant art.

Director 202 is configured to control the operational state of cameras 102, including, for example, when one or more of cameras 102 are "online." As well, director 202 may be configured to control settings, such as compression settings, used for a recorded video stream.

Schedules, compression settings, and the like, for cameras 102 are managed via core 204. In some embodiments, core 204 may comprise a web-based application, although core 204 may be embodied within a software architecture, embedded within the firmware and/or architecture of a hardware device, and combinations thereof. Periodically, for example, every ten minutes, director 202 is configured to issue a web request to core 204 to refresh its assigned schedule, compression settings, and the like. As well, and as part of this periodic exchange between director 202 and core 204, director 202 may notify core 204 if a camera 102 has failed, become unresponsive, or the like. Accordingly, core 204 may use this periodic exchange to establish the health of all interconnected systems and hardware, and to notify administrators in the event of an outage or other defined status or condition. Should any director 202 miss a scheduled, periodic exchange with core 204, relevant director 202 may be assumed to be offline or otherwise in need of appropriate repair or technical support.

Periodically, for example, nightly, director 202 may issue a web request to core 204 to ascertain whether there are relevant director 202 application software updates. If so, director 202 may download, synchronize, install, and configure any relevant updates.

Figure 7:
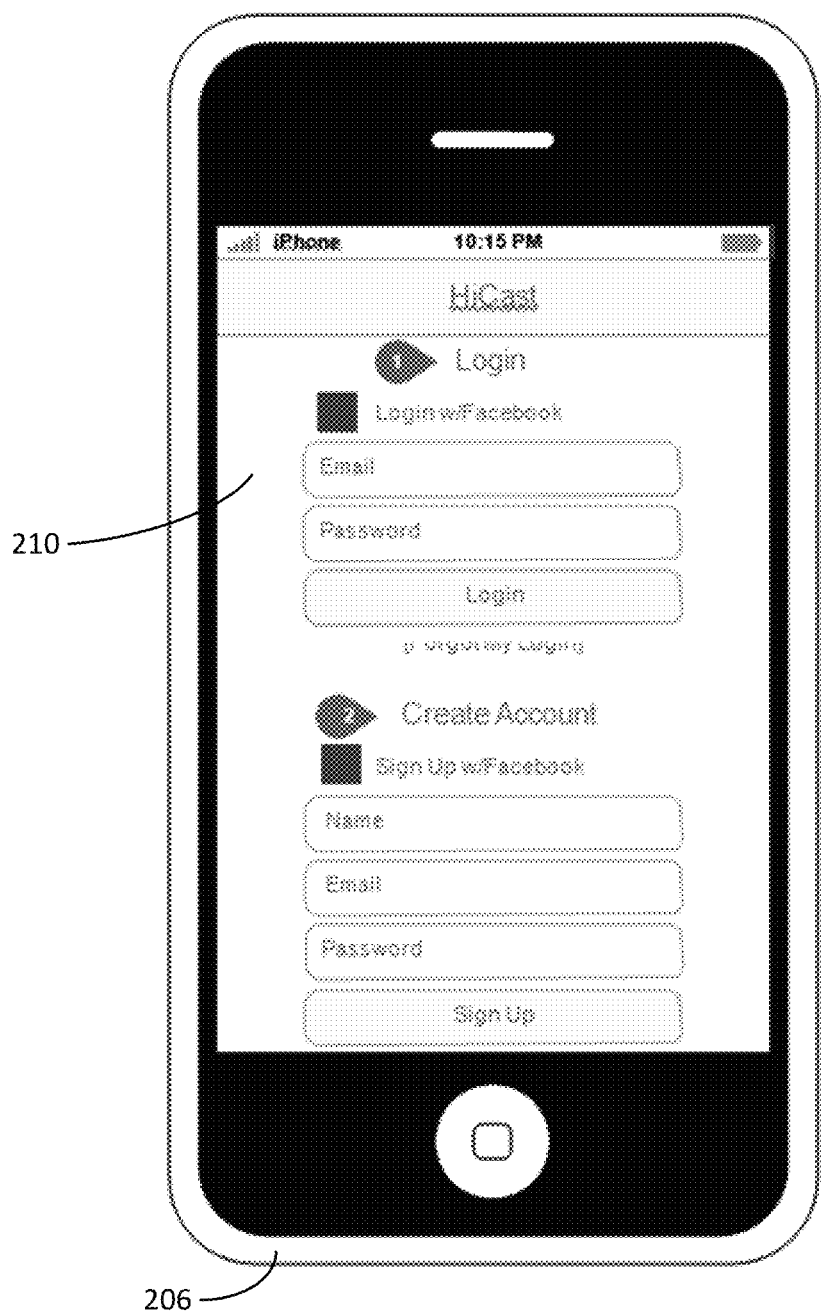
FIG. 7 depicts a subscriber mobile device running an application configured to interoperate with the sports-related video sharing system in accordance with an embodiment of the present disclosure, and further depicting a representative subscriber account log in and creation screen.

Turning now to FIG. 7, an embodiment of system 200 is depicted as configured for operation in association with mobile device 206. In the embodiment depicted by FIG. 7, an application, or app, is launched and loaded on a subscriber's mobile device 206, mobile device 206, as depicted, taking the form factor and operational characteristics of a handset, smart phone, phablet, or the like. On launch of the app, if the subscriber is not logged in, login screen 210 will be displayed. From this screen, the subscriber is able to log in or create an account.

In some embodiments, the subscriber may choose to log in or create an account using her credentials from another social network or network platform account, such as FACEBOOK, GOOGLE, or the like. In such instances, credential validation is administered via an appropriate, web-enabled, open architecture, application programming interface ("API"), as is known in the relevant art. Alternatively, the subscriber may choose to log in or create an account using her personal credentials, such as her name, email address, password, and/or the like.

Upon successful log in, the subscriber may be directed to, or may choose to navigate to, settings screen 212, as will be discussed in greater detail hereinbelow, in order to verify and/or update her social media credentials and related information.

Figure 8:
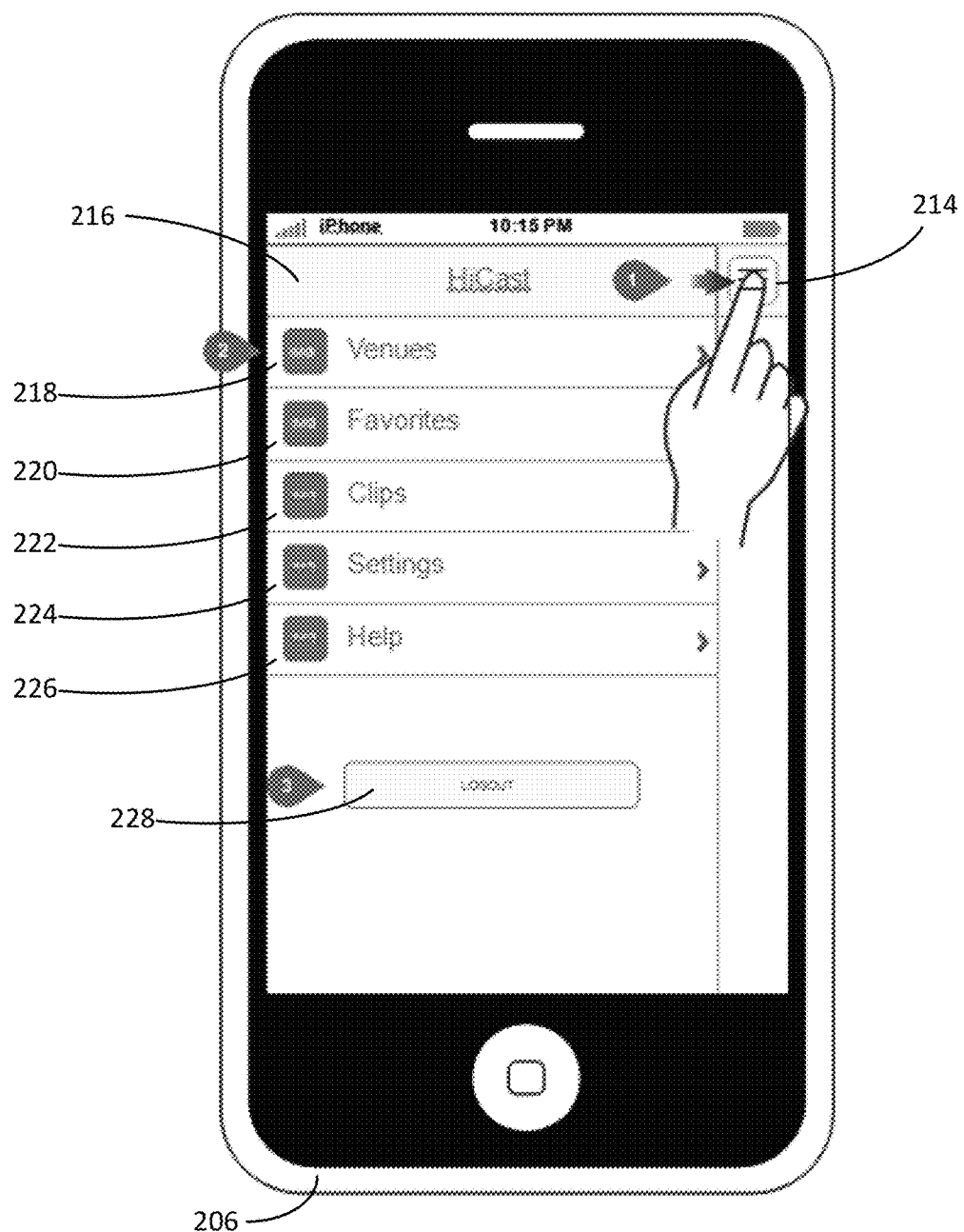
FIG. 8 depicts a subscriber mobile device running an application configured to interoperate with the sports-related video sharing system in accordance with an embodiment of the present disclosure, and further depicting a representative navigation menu and options screen.

As depicted in FIG. 8, tapping a navigation button or swiping a navigation bar 214 will slide the main interface, for example, to the right, revealing navigation menu 216. Selecting a navigation option will load a corresponding screen and close navigation menu 216. In some embodiments, such as one shown in FIG. 8, navigation options such as venues 218, favorites 220, clips 222, settings 224, and help 226 are available. Venues 218 option allows the subscriber to search for enabled venues. Favorites 220 option lists the subscriber's saved "favorite" venues. Clips 222 option lists the subscriber's downloaded video clips 203. Settings 224 option provides access to the subscriber's social media account credentials and related information. Help 226 option loads the main help interface screen 290. Clicking logout button 228 will log out the subscriber and reload the login screen.

Figure 9:
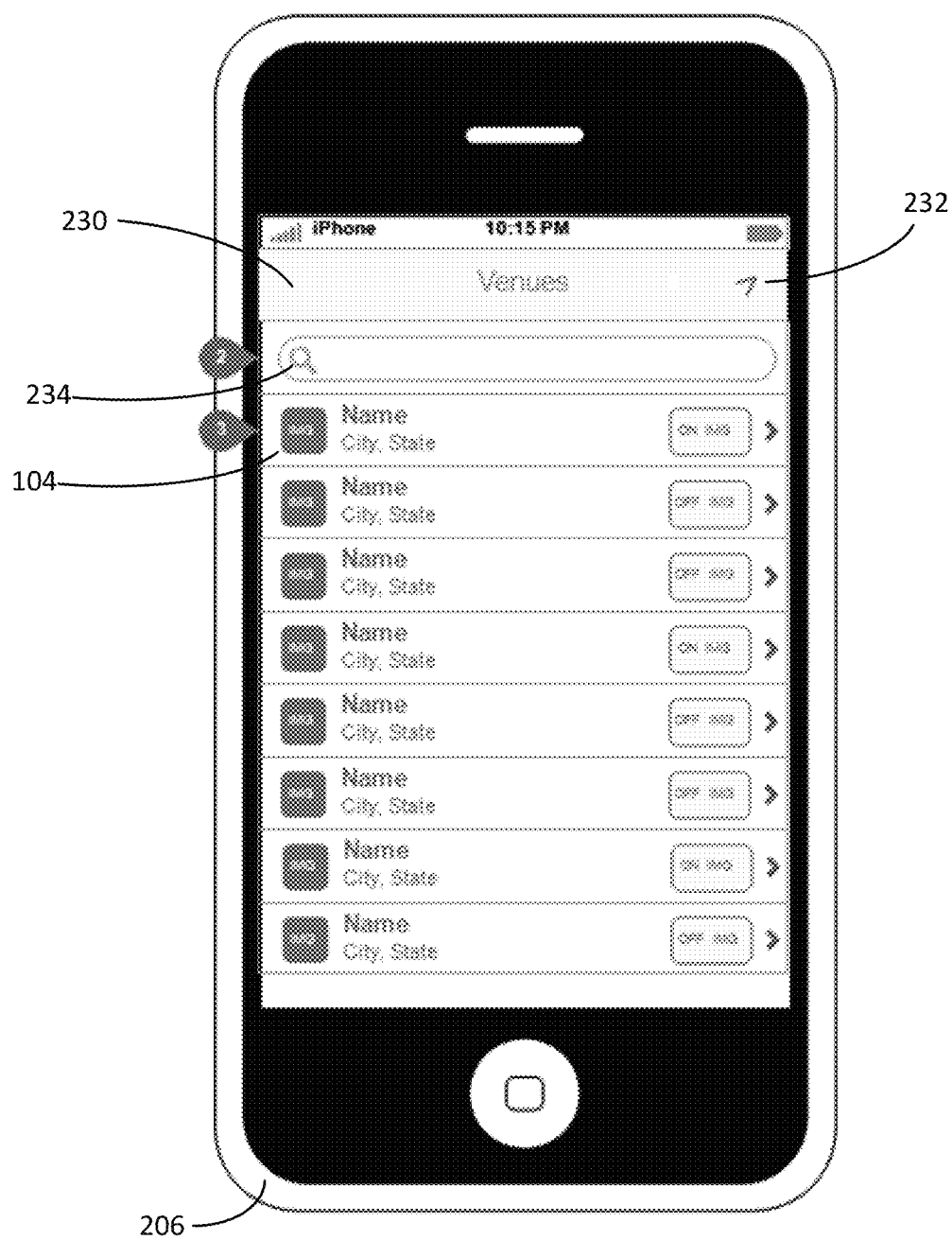
FIG. 9 depicts a subscriber mobile device running an application configured to interoperate with the sports-related video sharing system in accordance with an embodiment of the present disclosure, and further depicting a representative venue screen.

As depicted in FIG. 9, venues screen 230 lists all available venues 104 in system 200. Logical defaults may be selected, for example, such as listing venues 104 in alphabetical order by venue name. Clicking "locate me" button 232 will re-order the listings by distance from the subscriber, with the closest venues 104 listed first.

Using search bar 234, a subscriber can filter the listing of venues 104 by, for example, name and city. Each listed venue 104 may comprise an image representing the corresponding venue, the venue name, city, and state, as well as an "online" or "offline" graphic or other indicator, designating whether that particular venue currently has one or more directors 202 online. Selecting a particular venue 104 forwards the subscriber to a separate venue screen 236 corresponding to the selected venue 104.

Figure 10:
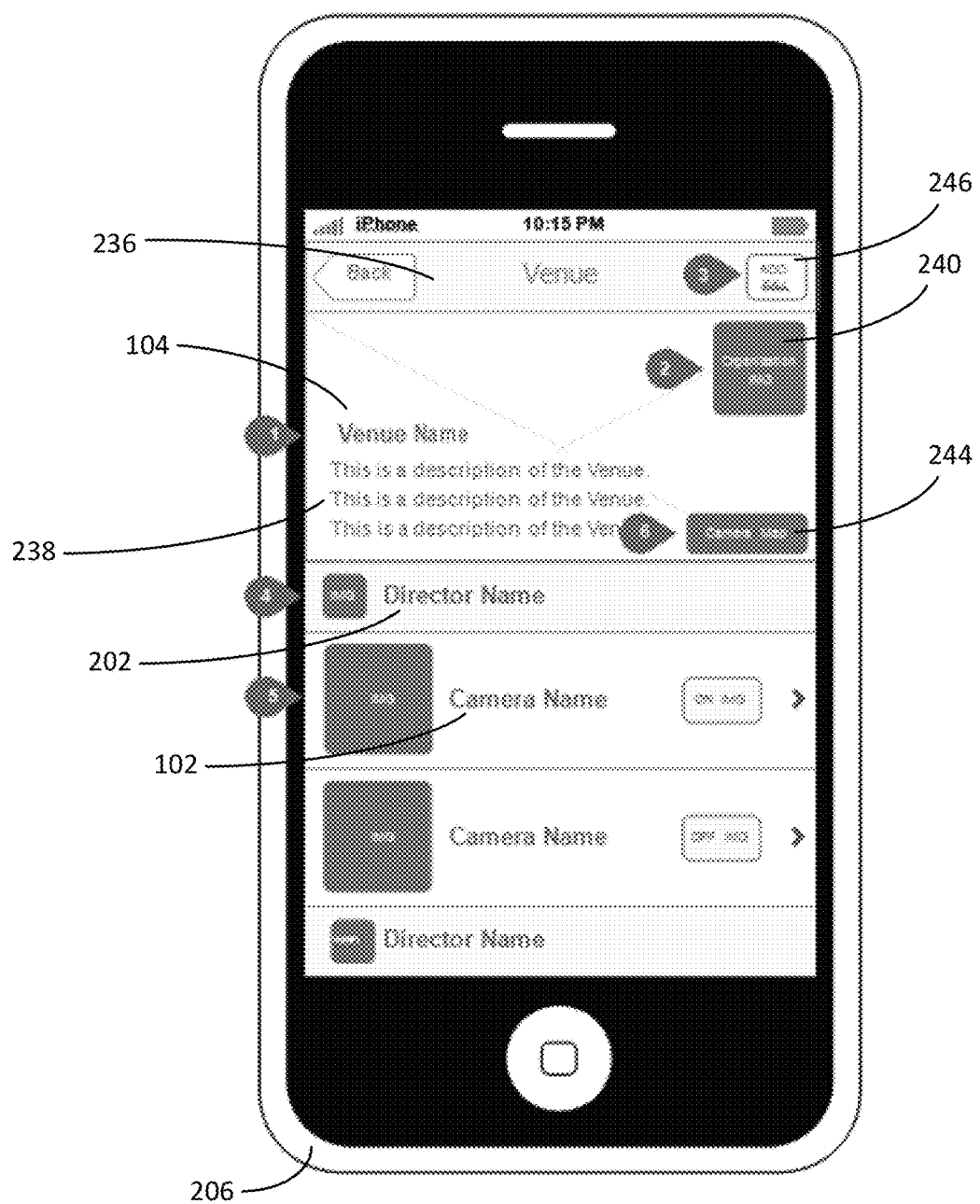
FIG. 10 depicts a subscriber mobile device running an application configured to interoperate with the sports-related video sharing system in accordance with an embodiment of the present disclosure, and further depicting a representative venue detail screen.

As depicted in FIG. 10, venue screen 236 corresponding to a selected venue 104 provides information on selected venue 104, as well as lists cameras 102 available at selected venue 104. A main information area 238 may display a venue background graphic, name, and brief description.

In the upper right corner, for example, may be an image of an organization 240 that is associated with selected venue 104. Clicking on the image will forward the subscriber to the organization information screen 242. Clicking on camera map button 244 will open a pre-saved map, or a link in the form of a uniform resource locator ("URL"), of camera locations.

On the right side, for example, of navigation bar 214 is the "add as favorite" button 246. Selecting this button will add this venue to the subscriber's list of favorite venues. If the venue has already been selected, the button will, in some embodiments, load in its active state; whereas, selecting the button again will, in such embodiments, remove the venue as a favorite.

Below the venue information content is a list of cameras 102 at the venue, organized by director 202. Each director listing comprises a director icon image and the name of the particular director. Each camera listing comprises an image of the first frame of the last video clip 203 recorded, the name of the camera, and an "online" or "offline" graphic image representing the current recording status of the camera. Selecting a particular camera forwards the subscriber to camera screen 248 for the camera.

Figure 11:
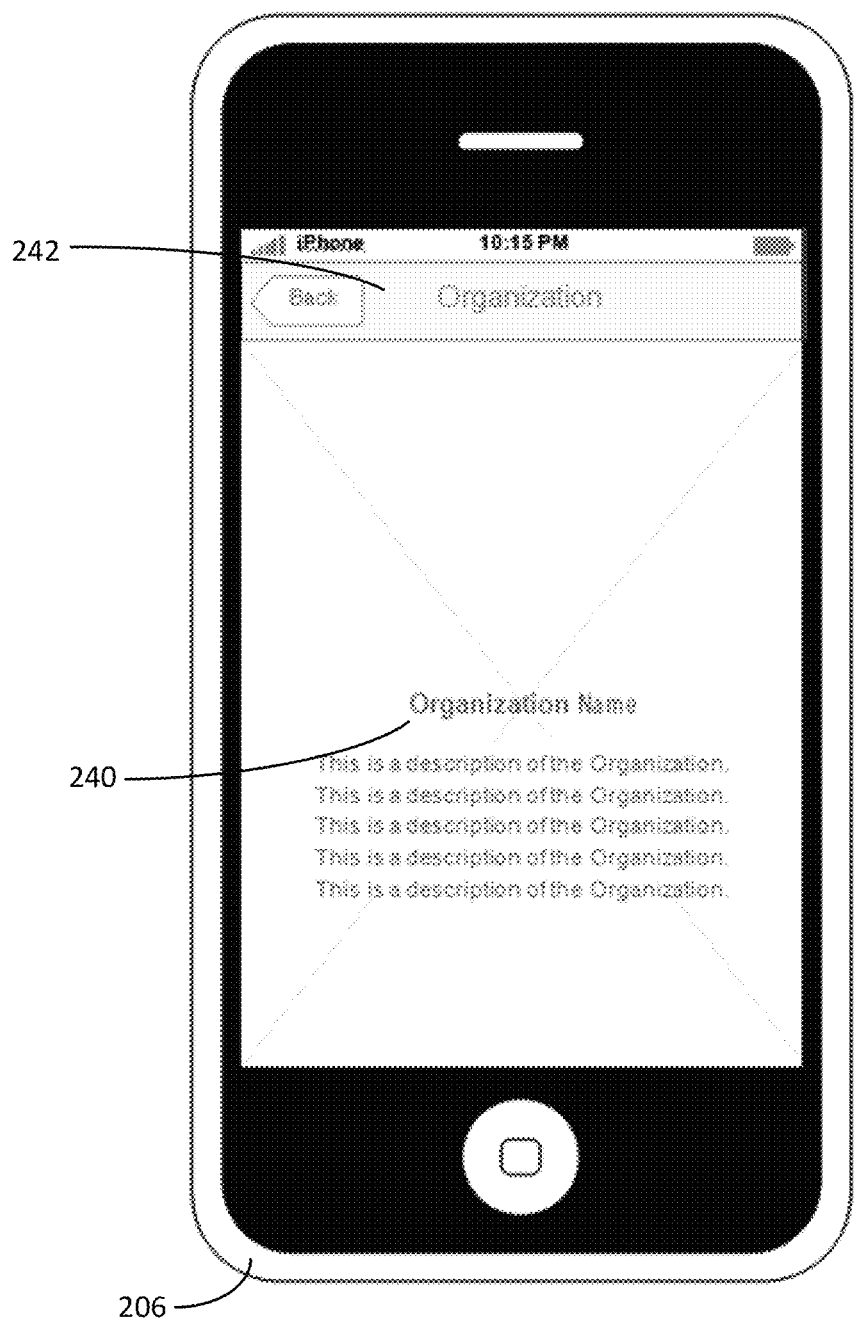
FIG. 11 depicts a subscriber mobile device running an application configured to interoperate with the sports-related video sharing system in accordance with an embodiment of the present disclosure, and further depicting a representative organization screen.

FIG. 11 depicts organization information screen 242. Organization information screen 242 may comprise information regarding the organization, including, but not limited to, a background graphic image, the organization name, and descriptive copy.

Figure 12:
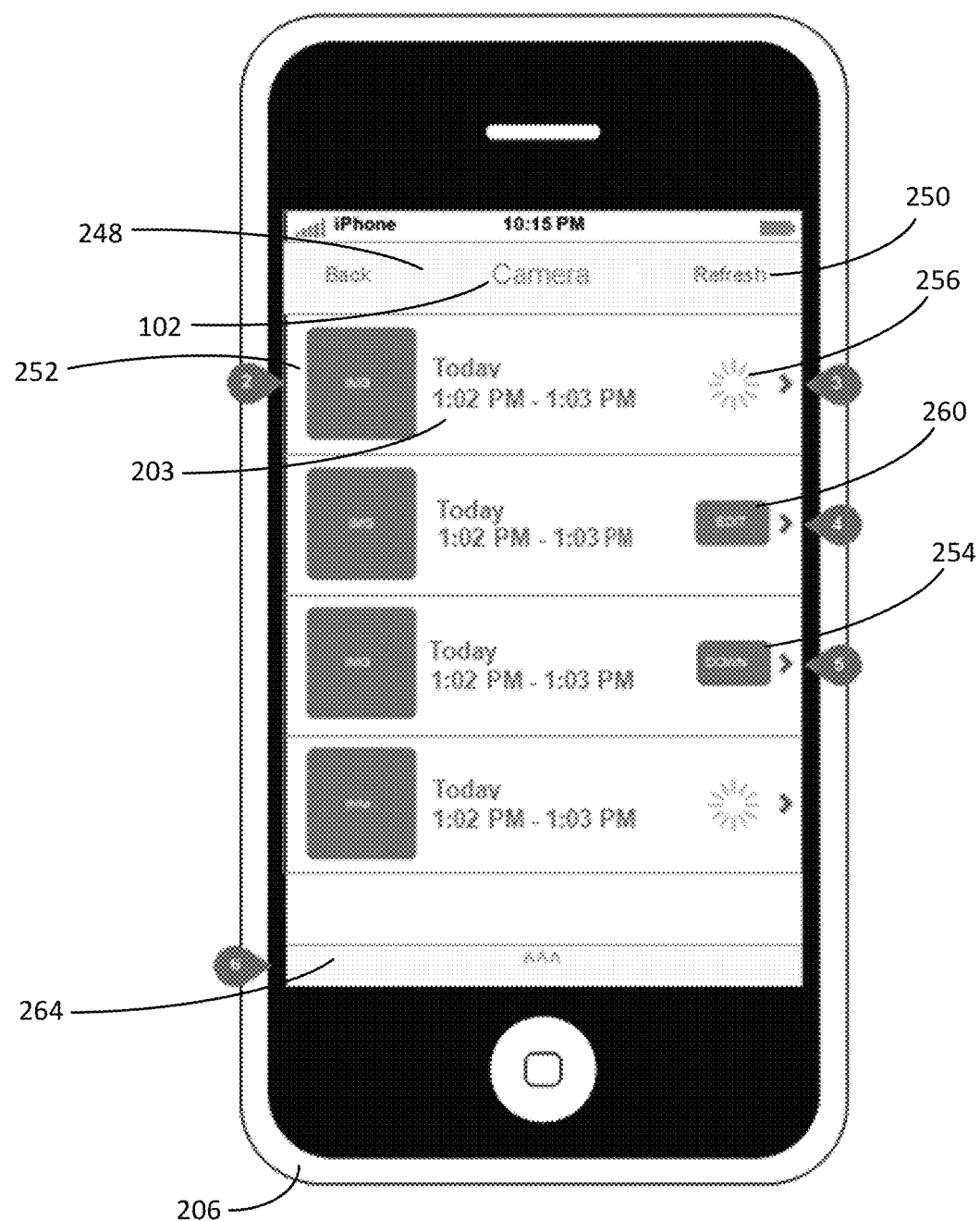
FIG. 12 depicts a subscriber mobile device running an application configured to interoperate with the sports-related video sharing system in accordance with an embodiment of the present disclosure, and further depicting a representative camera screen.

FIG. 12 depicts camera screen 248. Camera screen 248 lists all active video clips 203 for a given camera 102, ordered first by most recent. Each video clip 203 listing may be color coded, or otherwise designated in some way, based upon how many times the video clip has been downloaded. Such visual designation may act to distinguish particular video clips based, for example, upon subscriber popularity. Clicking refresh button 250 will refresh the listing.

Each camera listing 252 comprises a "preview" image displaying, for example, the first frame of a video clip 203, the day, the time range, and an "available for editing" status icon. Selecting to preview a video clip image will load the preview version of selected video clip 203 in the mobile device 206 standard video player application. Selecting download button 254 will begin downloading the mobile optimized version of selected video clip 203, and will switch to show progress wheel 256. Core 204 should be notified that a particular video clip 203 was selected, so that a corresponding popularity rating may be adjusted.

Once a selected video clip 203 has finished downloading, selected video clip 203 is saved to the subscriber's clips list 258, and progress wheel 256 changes to edit button 260. Selecting edit button 260 loads the selected video clip 203 into "edit and share" screen 262. Clicking navigation button 264, for example, at the bottom of camera screen 248 opens a picker listing of incremental time blocks, such as by hour of day, for navigation. On first load, an overlay may appear to inform the subscriber to rotate mobile device 206 to go into a "scrubbing" mode of operation, as will be discussed in greater detail below.

Figure 13:
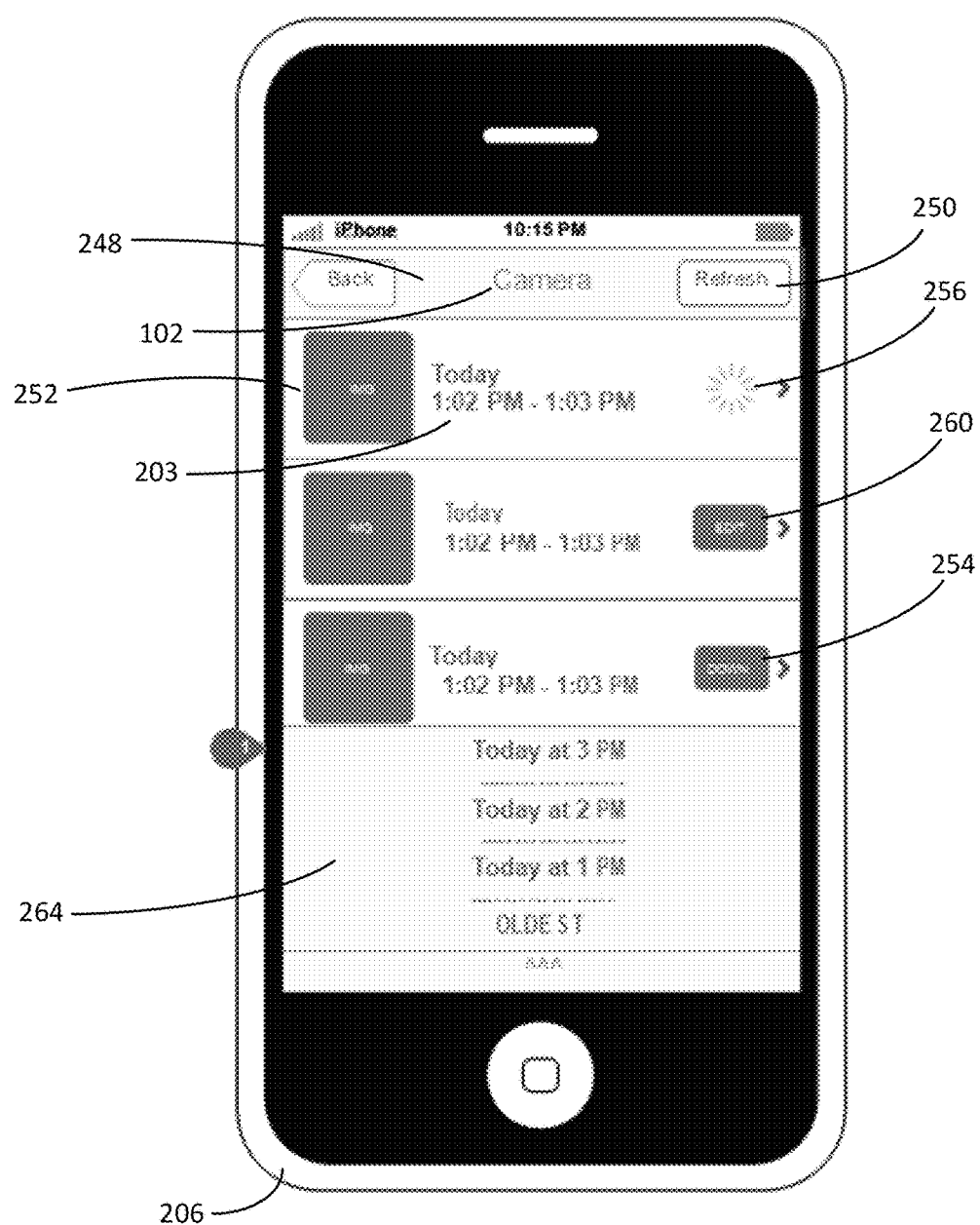
FIG. 13 depicts a subscriber mobile device running an application configured to interoperate with the sports-related video sharing system in accordance with an embodiment of the present disclosure, and further depicting a representative expanded functionality camera screen.

FIG. 13 depicts camera screen 248 displaying navigation area 264 expanded. The subscriber may select a time corresponding to a particular video clip 203, in order to jump to that time and corresponding video clip 203 in the main listing.

Figure 14:
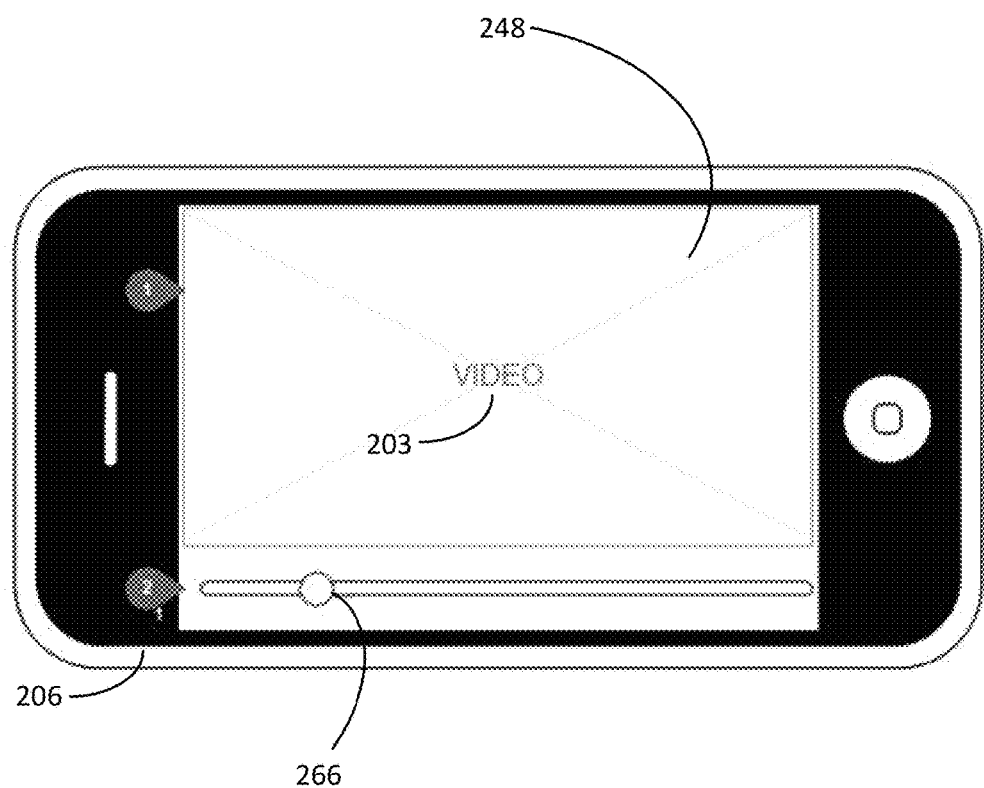
FIG. 14 depicts a subscriber mobile device running an application configured to interoperate with the sports-related video sharing system in accordance with an embodiment of the present disclosure, and further depicting a representative video scrubbing screen.

FIG. 14 depicts mobile device 206 in a camera screen 248 "scrubbing" mode of operation. While on camera screen 248, if the subscriber rotates the screen into landscape orientation, the view will automatically change to a preview scrubbing mode of operation, whereby the subscriber may move through a series of selected, often consecutive, video clips 203 by dragging slider 266. This mode of operation essentially allows the subscriber to rapidly skim through the contents of one or a plurality of selected video clips 203.

Accordingly, in this mode of operation, one or more video clip 203 is displayed in wide-screen format, with slider 266 at the bottom of the screen, allowing the subscriber to "scrub" through one or more preview video clips 203. In some embodiments, upon loading, the scrubbing mode screen will group a selected time span of clips together, for example, a ten minute span of video clips, allowing the subscriber to seamlessly scrub through the video clips covered by the selected time span. When the subscriber is finished, she may turn mobile device 206 back to landscape orientation, which will operate to re-load the normal camera screen, with video clip 203 selected that corresponds to the position and time associated with scrubbing slider 266.

Figure 15:
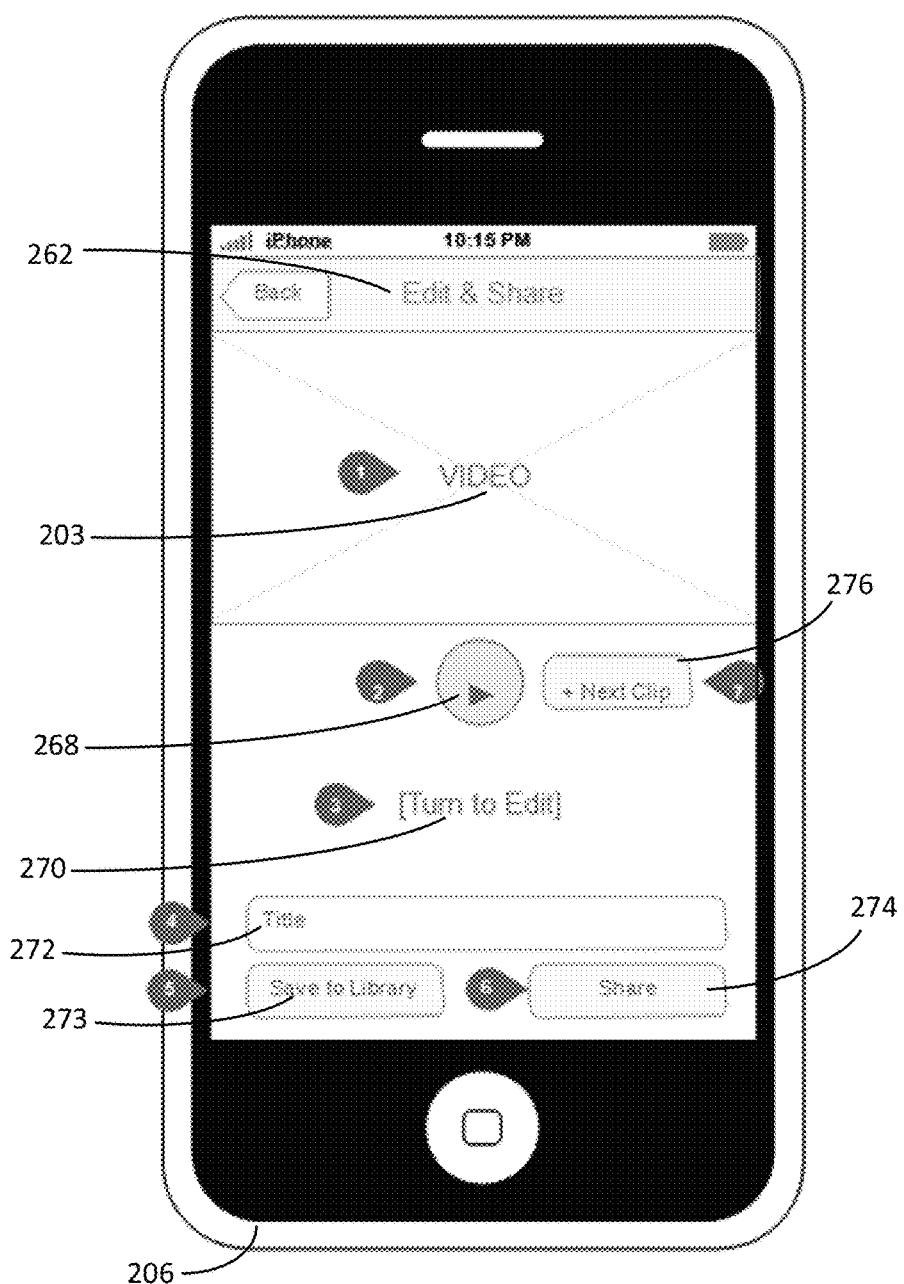
FIG. 15 depicts a subscriber mobile device running an application configured to interoperate with the sports-related video sharing system in accordance with an embodiment of the present disclosure, and further depicting a representative edit and share screen.

FIG. 15 depicts "edit and share" screen 262, which allows the subscriber to edit a video clip 203 and share it online, for example, via one or more social media channels and/or outlets 208. A selected video clip 203 is presented at the top of "edit and share" screen 262. Clicking play button 268 plays video clip 203 from the beginning. Play button 268 is configured, in some embodiments, so as always to play video clip 203 with current trim and zoom settings applied.

The subscriber may turn mobile device 206 to landscape mode in order to load editing interface 270. The subscriber may enter title 272 to be shown at the beginning of video clip 203. A video introductory screen may be presented and may display selected branding or other indicia of sponsorship, origin, or the like, without regard to whether title 272 has been added.

When the subscriber has completed her editing of video clip 203, she may use save button 273 to save edited video clip 203 to her local camera roll, gallery, or other memory and/or storage facility residing within or upon mobile device 206. Still alternatively, or in addition, the subscriber may choose to save edited video clip 203 or video highlight reel to an external storage facility, such as, but not limited to, any of a variety of cloud-based, network-based, or other storage solutions as are well-known in the relevant art. Yet still alternatively, or in addition, the subscriber may launch share screen 274, allowing the subscriber to share video clip 203 through any of a variety of social media channels and/or outlets 208.

Selecting "append next clip" button 276 will download and append the next video clip 203 in the video clip timeline to the existing video clip 203. Progress wheel 256 may replace "append next clip" button 276 while the next video clip is being appended. In some embodiments, only one video clip may be appended to another, allowing the subscriber effectively to increase the length of video clip 203, for example, if the sports play of interest happened to span a time period across two consecutive video clips.

Figure 16:
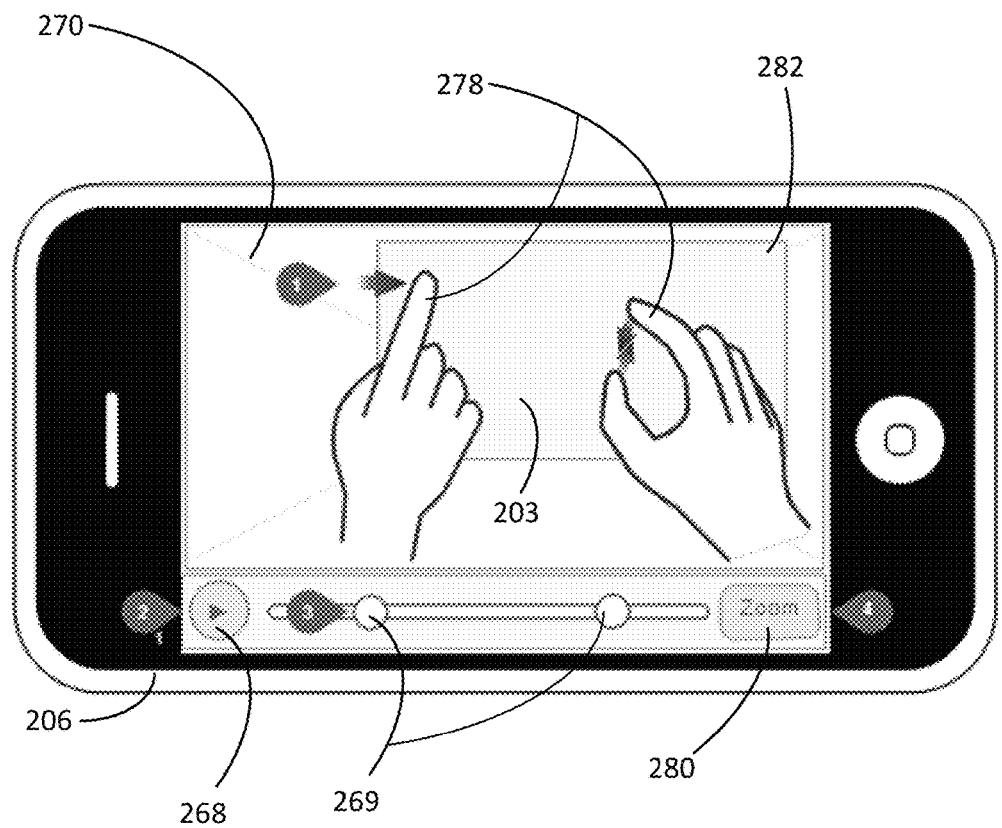
FIG. 16 depicts a subscriber mobile device running an application configured to interoperate with the sports-related video sharing system in accordance with an embodiment of the present disclosure, and further depicting a representative editing interface screen.

FIG. 16 depicts editing interface screen 270. In editing mode, the subscriber is able to play video clip 203 via play button 268, to trim the length of video clip 203 via slider controls 269, and/or to "pan" and "zoom" video clip 203, all during editing of the clip. In some embodiments, the first time editing interface screen 270 is loaded, help overlays, for example, such as graphic representations of hands 278, depicting associated editing gestures, may be displayed in order to demonstrate use of editing interface screen 270 to the subscriber.

In some embodiments, if the subscriber selects "pan and zoom" button 280, a semi-transparent overlay box 282 may be displayed over or on top of the video content comprising video clip 203. "Pan and zoom" button 280 may be updated to read, "save." According to currently available and oft-used mobile device interface guidelines and associated interface programming, the subscriber is able to slide and pinch overlay box 282 in order to change its location and size. In some embodiments, the size of overlay box 282 is configured always to maintain a consistent video dimensional aspect ratio, and overlay box 282 may not be permitted to move past the bounds of the video content comprising video clip 203.

When the subscriber has completed her adjustment of overlay box 282, she may hit button 280, now reading "save," which applies cropped settings corresponding to the "pan and zoom" effect to selected video clip 203. Once saved, button 280 may be changed to "reset" pan and zoom button 280. In such configuration, selecting button 280 would remove the previously applied cropped settings; thereby, reverting video clip 203 to its original state.

Rotating mobile device 206 to a portrait orientation reloads aforedescribed "edit and share" screen 262.

Figure 17:
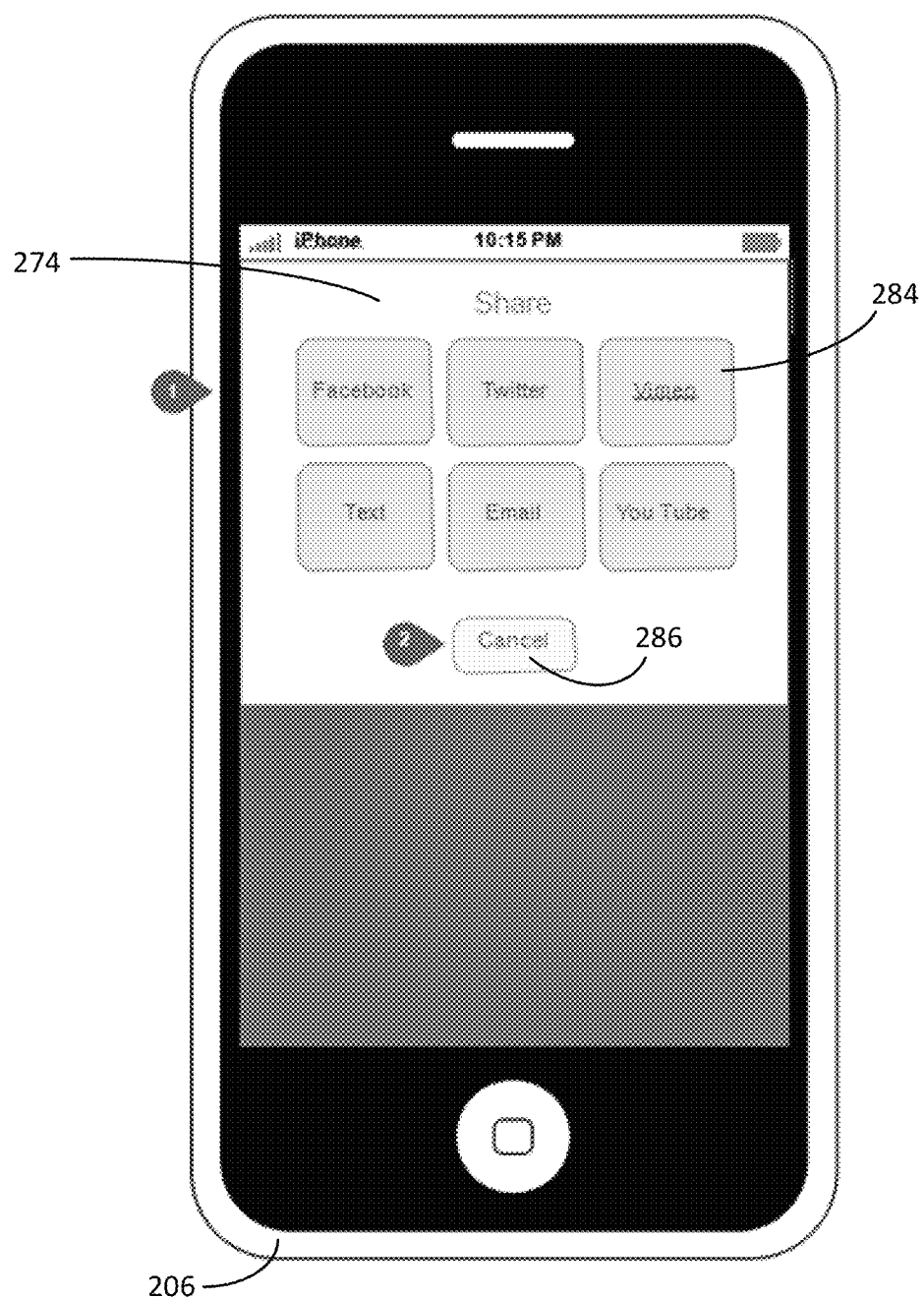
FIG. 17 depicts a subscriber mobile device running an application configured to interoperate with the sports-related video sharing system in accordance with an embodiment of the present disclosure, and further depicting a representative share screen.

Turning to FIG. 17, share screen 274 allows the subscriber to share one or more selected video clips 203 through any of a variety of social media channels and/or outlets 208. In some embodiments, a subscriber may share selected video clip 203 via such social media online channels and/or outlets 208 including, but not limited to, FACEBOOK, TWITTER, VIMEO, YOUTUBE, and/or the like, without limitation. As well, a subscriber may share selected video clips 203 via email, text, MMS, cloud and network accessible storage services, and the like, such as have been previously described, including with regard to embodiments of system 100.

Selecting one of a plurality of share icons 284 will launch a corresponding screen appropriate for, and associated with, the selected social media channel and/or outlet 208. In some embodiments, when a subscriber shares selected video clip 203 for the first time, video clip 203 may automatically be saved to the subscriber's local camera roll, gallery, or other memory and/or storage facility residing within or upon mobile device 206. In some embodiments, when sharing video clip 203 via social media channel and/or outlet 208, an appropriate "hash-tag" or other social media-specific designator may be automatically appended, containing, for example, selected branding or other indicia of sponsorship, origin, or the like, as a component of a default message accompanying shared video clip 203. Selecting cancel button 286 will act to close share screen 274.

Figure 18:
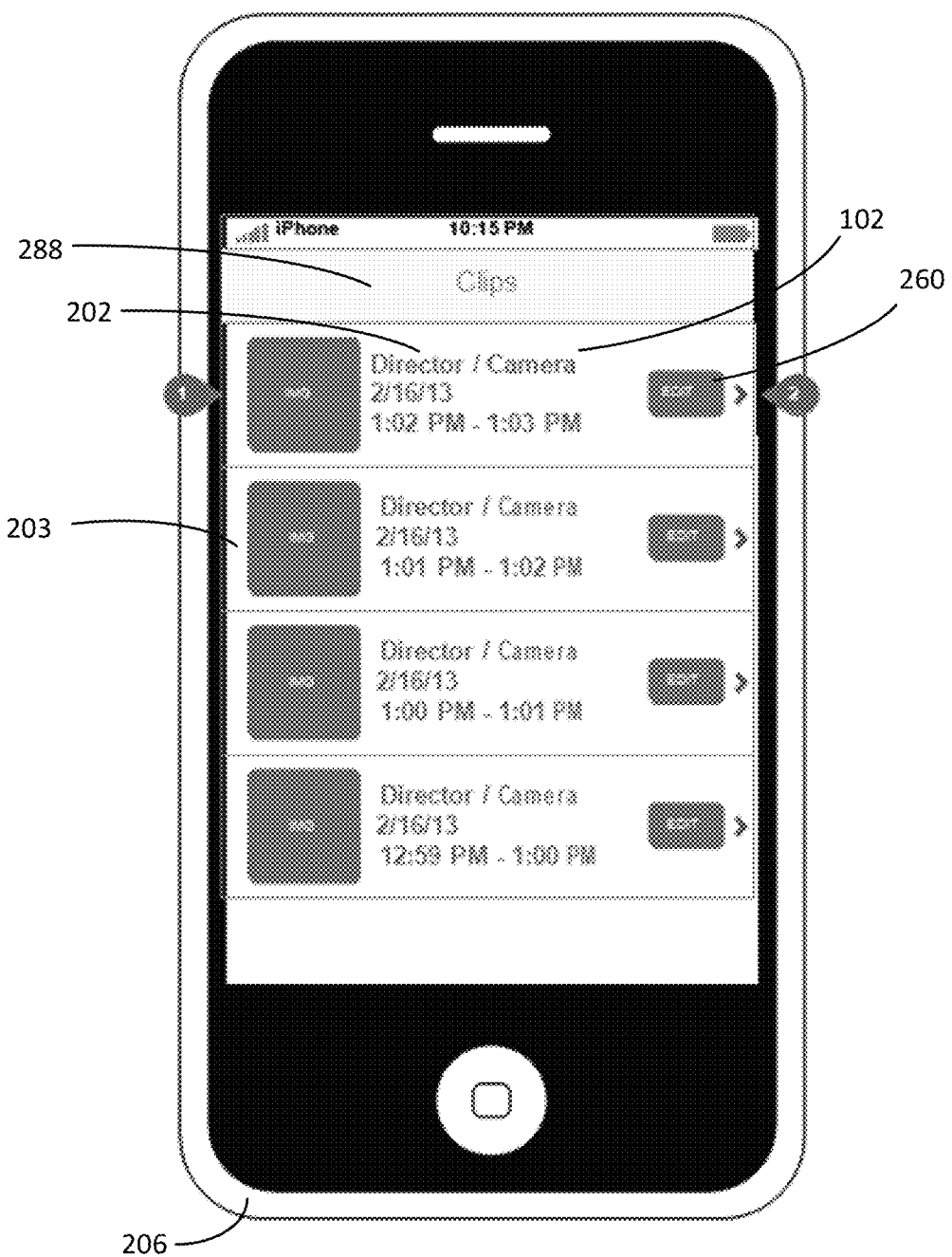
FIG. 18 depicts a subscriber mobile device running an application configured to interoperate with the sports-related video sharing system in accordance with an embodiment of the present disclosure, and further depicting a representative clips screen.

FIG. 18 depicts clips screen 288, which lists all of the subscriber's downloaded video clips 203. Each video clip listing 203 comprises an image such as, for example, the first frame of video clip 203, the name of corresponding director 202 and camera 102, the date and time range during which the video clip was recorded, and edit button 260. Selecting edit button 260 will load video clip 203 into "edit and share" screen 262. In some embodiments, the listing should respond to a swipe-to-delete gesture, according to currently available and oft-used mobile device interface guidelines and associated interface programming.

Figure 19:
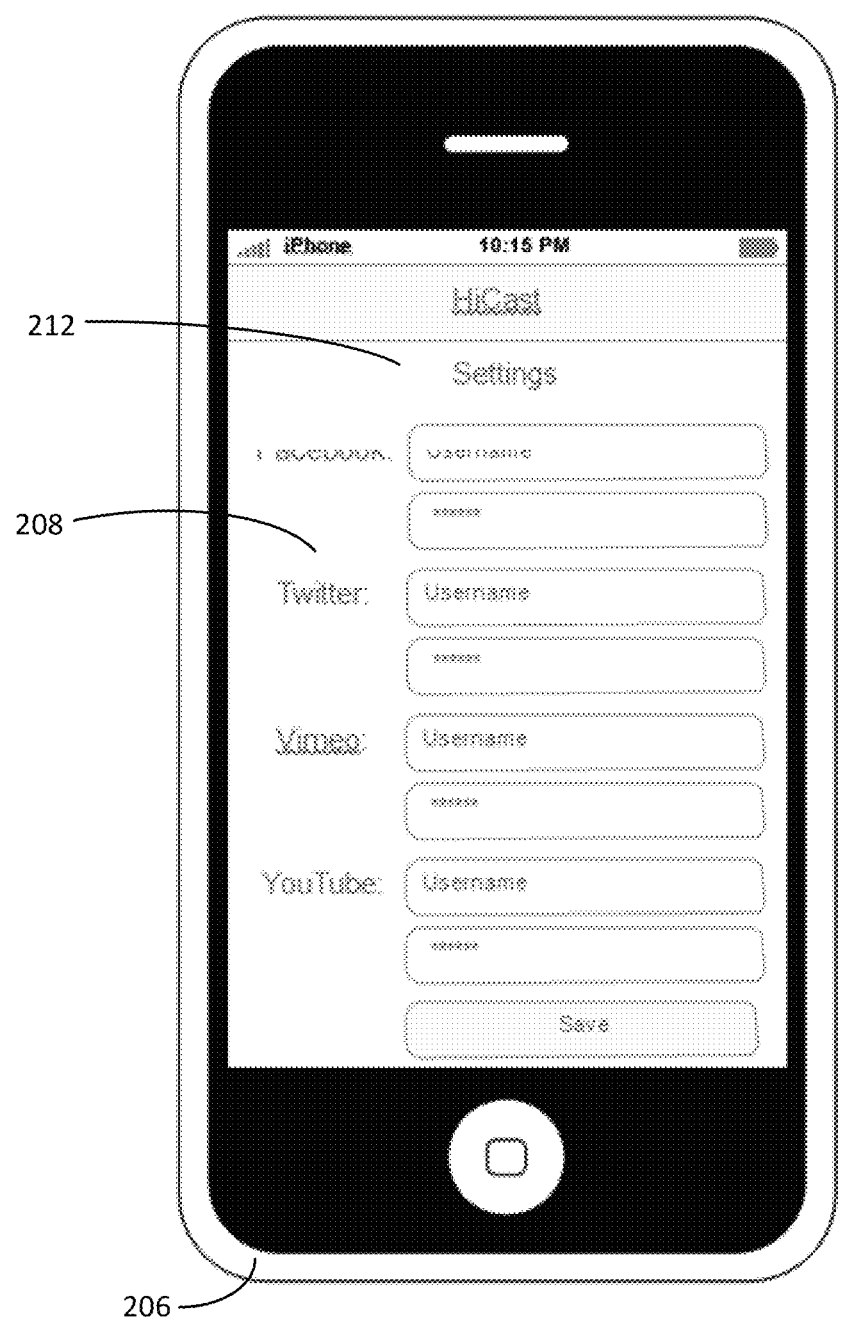
FIG. 19 depicts a subscriber mobile device running an application configured to interoperate with the sports-related video sharing system in accordance with an embodiment of the present disclosure, and further depicting a representative settings screen.

FIG. 19 depicts settings screen 212, which was introduced above. Settings screen 212 allows the subscriber to save her social media channels and/or outlets 208 login credentials and associated information. In some embodiments, subscriber credentials may be updated and securely stored on core 204. When a subscriber initially logs in, her settings may be dynamically pulled from core 204 and saved on mobile device 206. In such embodiments, this behavior will allow multiple subscribers to log in and log out of the system 200 app on the same mobile device 206, and enabling each subscriber's social media settings to be pre-loaded on a per session and per subscriber basis.

Figure 20:
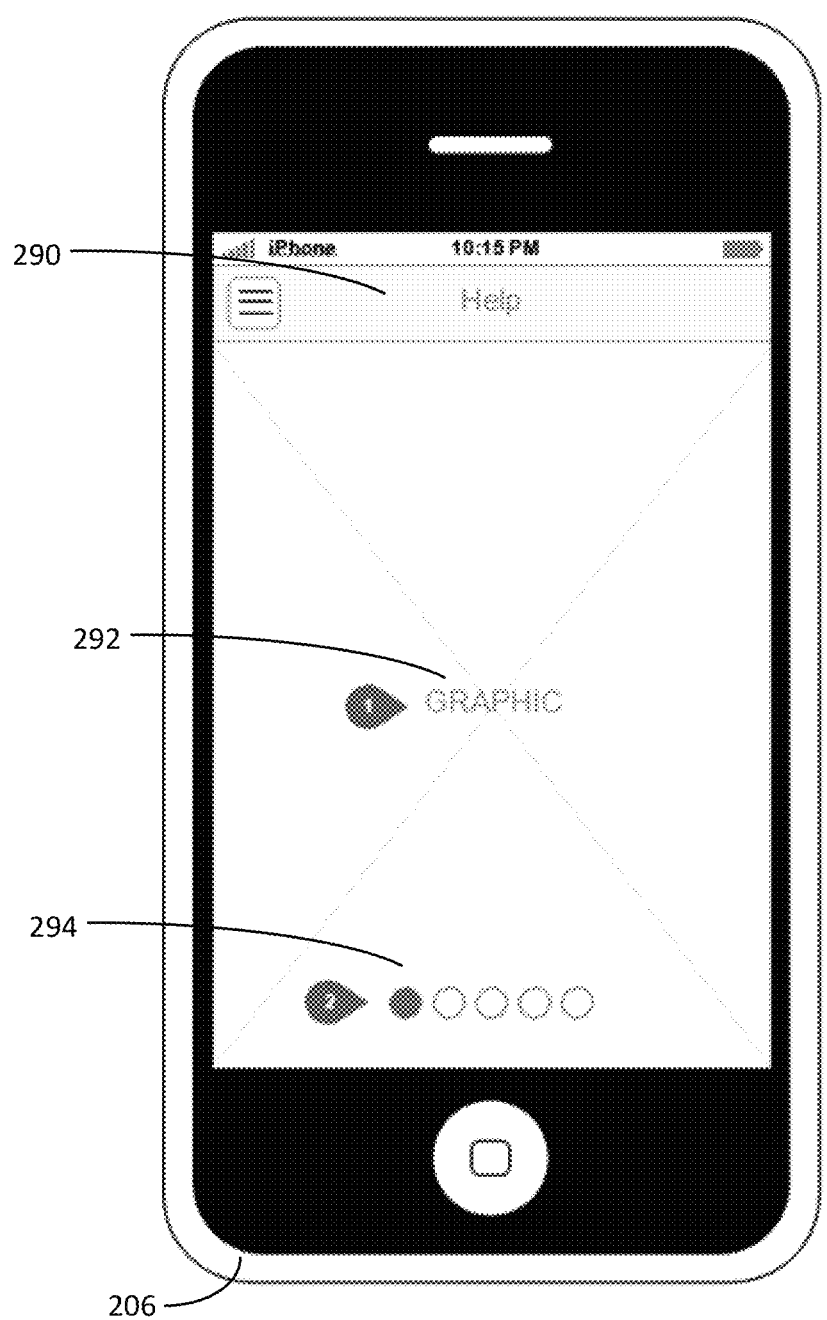
FIG. 20 depicts a subscriber mobile device running an application configured to interoperate with the sports-related video sharing system in accordance with an embodiment of the present disclosure, and further depicting a representative help screen.

FIG. 20 depicts help screen 290, which, in some embodiments, may comprise a slideshow of images displaying helpful information regarding system 200 app to the subscriber. Each slideshow image 292 may be loaded in a full screen mode. Swiping left or right, according to currently available and oft-used mobile device interface guidelines and associated interface programming, loads a previous or next slideshow image 292, respectively. Pagination bar 294, according to currently available and oft-used mobile device interface guidelines and associated interface programming, may be displayed at the bottom of help screen 290.

Figure 21:
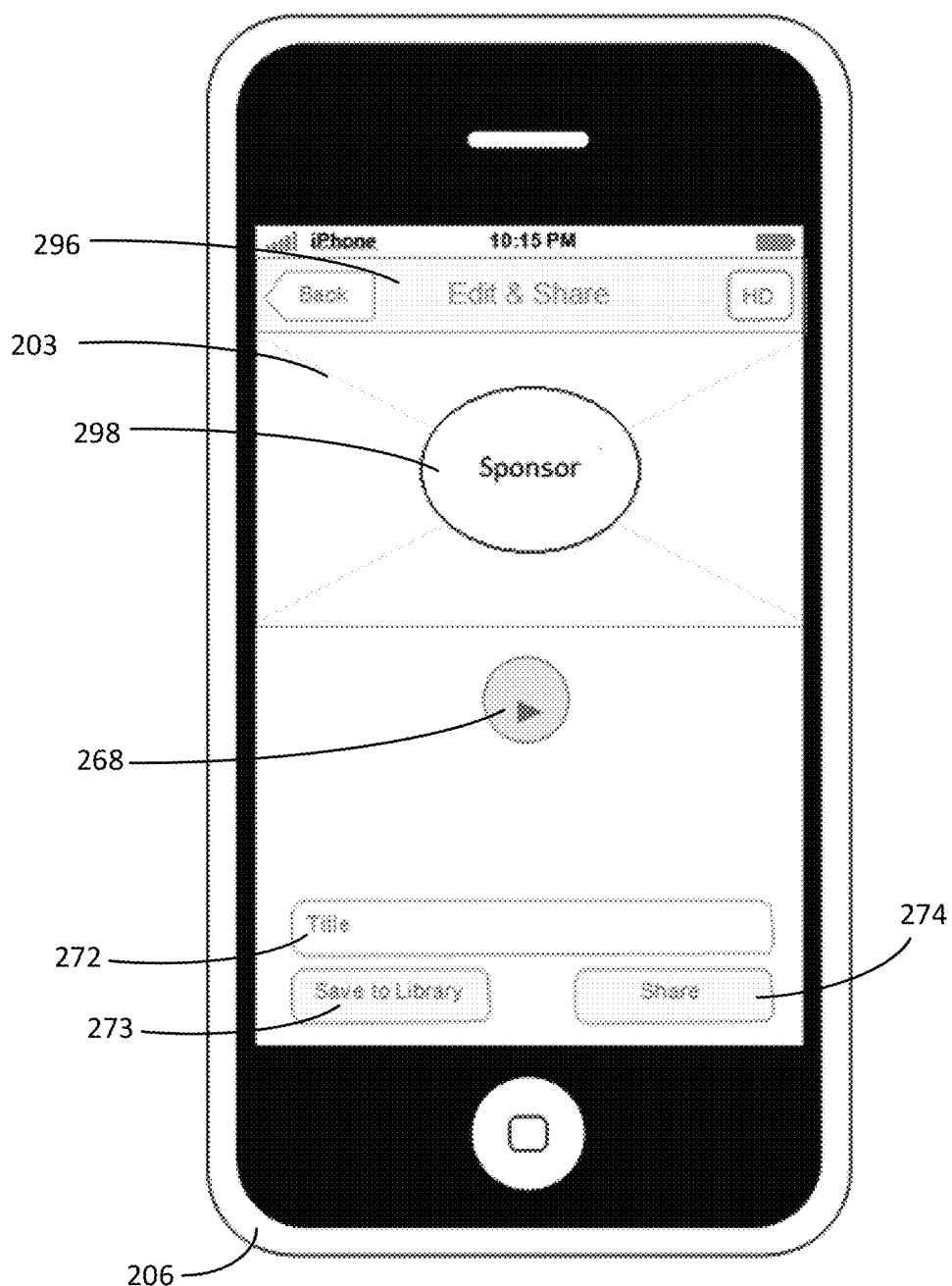
FIG. 21 depicts a subscriber mobile device running an application configured to interoperate with the sports-related video sharing system in accordance with an embodiment of the present disclosure, and further depicting a representative sponsorship screen with bumper content.

FIG. 21 depicts sponsorship screen 296. It will be appreciated that, on some mobile devices 206, there may be very little on-screen "real estate" within a mobile device app. Accordingly, in some embodiments, the sharing-based focus of system 200 video clips 203 may be enhanced and/or supported by use of sponsorships. Sponsorship information may be included as or within "bumpers," for example, bumper 298, which may be loaded at the beginning and/or end of each video clip 203 that is created.

In such embodiments, a bumper may be added to the beginning of each video clip 203. This may be accomplished by isolating the first frame of video clip 203, optionally adding an appropriate tag line, and displaying and/or playing bumper 298 for an initial, select period of time, for example, three seconds, prior to initiating playback of video clip 203. In this manner, when video clip 203 is queued for playback, sponsorship information, such as a corporate logo, sponsorship branding, tag line, and/or the like will be displayed.

As will be described in greater detail hereinbelow, video clips 203 inherit sponsors from a data structure corresponding to a venue's and/or organization's defined sponsorship settings. In some embodiments, a selected video clip 203 may be populated with a bumper selected, for example, randomly, from associated sponsors and sponsor bumper image pools. In some embodiments, each bumper image may be attached to the end of selected video clip 203, and may be displayed for a preselected duration of time.

It will be appreciated that, with regard to mobile devices 206 having form factors accommodating and/or providing greater on-screen "real estate," sponsorship presentations comprising alternative forms and/or formats may be provided.

Figure 22A:
FIG. 22A depicts a subscriber mobile device running an application configured to interoperate with the sports-related video sharing system in accordance with an embodiment of the present disclosure, and further depicting a first representative introductory screen thereof.
Figure 22B:
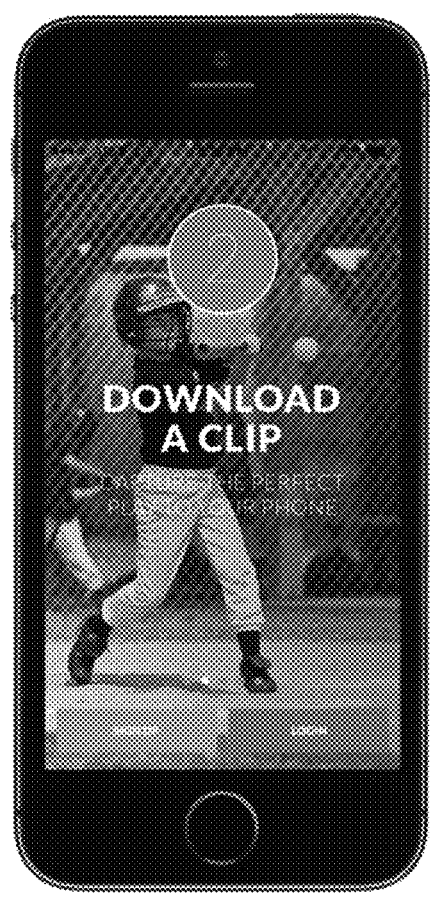
FIG. 22B depicts a subscriber mobile device running an application configured to interoperate with the sports-related video sharing system in accordance with an embodiment of the present disclosure, and further depicting a second representative introductory screen thereof.
Figure 22C:
FIG. 22C depicts a subscriber mobile device running an application configured to interoperate with the sports-related video sharing system in accordance with an embodiment of the present disclosure, and further depicting a third representative introductory screen thereof.
Figure 22D:
FIG. 22D depicts a subscriber mobile device running an application configured to interoperate with the sports-related video sharing system in accordance with an embodiment of the present disclosure, and further depicting a fourth representative introductory screen thereof.

Turning now to FIGS. 22A-22L, depicted is a subscriber mobile device in the form of an APPLE IPHONE running an illustrative embodiment of an application configured to interoperate with sports-related video sharing system 200. In such an embodiment, FIGS. 22A-22D depict introductory screens demonstrating to a subscriber thereof certain selected, illustrative functionality of sports-related video sharing system 200. For example, in FIG. 22A, the subscriber's ability to find a venue and locate a game field is depicted. In FIG. 22B, the subscriber's ability to download a clip to capture a play to the subscriber's mobile device is depicted. In FIG. 22C, the subscriber's ability to edit the downloaded clip to customize the subscriber's view of the play is depicted. And, in FIG. 22D, the subscriber's ability to share the downloaded and/or edited clip, for example, by posting the clip to the subscriber's favorite social network(s), is depicted. Other selected, illustrative functionality could, of course, be selected for depiction in addition to, or in lieu of, that depicted within FIGS. 22A-22D.

FIG. 22E depicts a representative venue screen showing a selected venue and its address. Also shown are available cameras corresponding to each specific field at the venue, as well as the online/offline status of the cameras covering each field. A subscriber may choose a field in which she is interested, in order to advance to the available recorded clips for that field.

FIG. 22F depicts a representative clips screen, showing the date of recording, the venue, and the field, along with preview images of the corresponding recorded and available clips for each recorded time interval. A subscriber may choose a time interval in which she is interested, such as a ten minute time interval, in order to advance to particular clips spanning the selected, recorded time interval for purposes of selecting, downloading, and editing one or more of the particular clips.

Figure 22G:
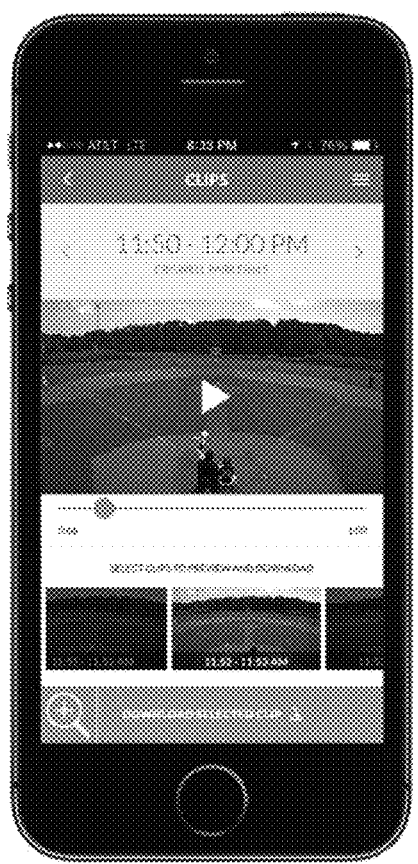
FIG. 22G depicts a subscriber mobile device running an application configured to interoperate with the sports-related video sharing system in accordance with an embodiment of the present disclosure, and further depicting a representative clips preview and download screen thereof.

FIG. 22G depicts a representative clips screen, showing a selected time interval of recording, the venue, and the field, along with preview images of corresponding recorded and available particular clips, such as one minute time interval clips, within each selected time interval. A subscriber may preview and play each recorded clip, and may choose to download one or more selected clip to her mobile device.

Figure 22H:
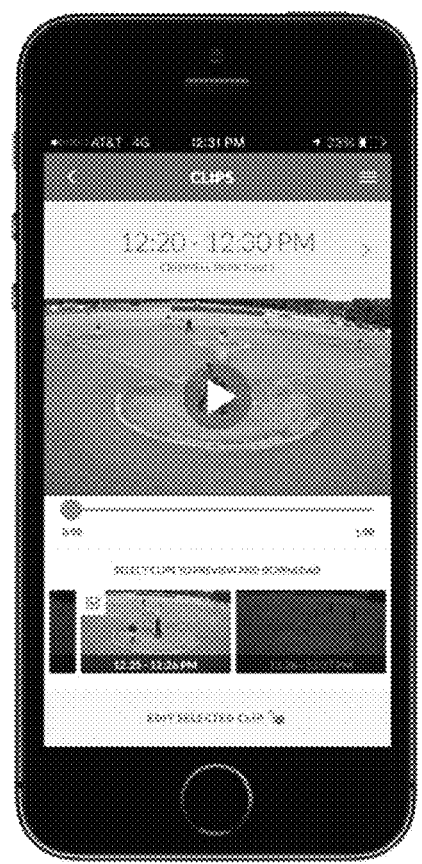
FIG. 22H depicts a subscriber mobile device running an application configured to interoperate with the sports-related video sharing system in accordance with an embodiment of the present disclosure, and further depicting a representative downloaded clips and edit screen thereof.

FIG. 22H depicts a representative clips screen, showing a selected time interval of recording, the venue, and the field, along with preview images of corresponding recorded and available particular clips, such as one minute time interval clips, within each selected time interval. A subscriber may preview and play each recorded clip, and may choose to select one or more clip for editing upon her mobile device.

FIG. 22I depicts a representative editing screen operating in a zoom mode. In such a zoom mode of operation, a subscriber may select a region of interest, enlarging or reducing its on-screen size. Accordingly, the video will be zoomed to that selected region of interest. That is to say, the video image will be resized and refocused within the on-screen video player limits, in order to show only that selected region of interest within the video stream, the remainder of the displayed video image being cropped and/or eliminated from view.

FIG. 22J depicts a representative editing screen operating in a trim mode. In such a trim mode of operation, a subscriber may select a time interval in which she is interested, and may use left and right-hand slider controls to trim the length of video clip to eliminate superfluous, unnecessary, uninteresting, and/or undesirable portions of the video falling before and/or after the trimmed time interval.

Figure 22K:
FIG. 22K depicts a subscriber mobile device running an application configured to interoperate with the sports-related video sharing system in accordance with an embodiment of the present disclosure, and further depicting a representative sharing screen thereof.

FIG. 22K depicts a representative, particular time interval, date, venue, field, and corresponding edited or unedited video clip. A subscriber may choose to share the video clip to others via any of a variety of means, including, but not limited to, social networking, social media, video hosting, chat, text, SMS/MMS, email, cloud and network accessible storage services, and like sites and services, whether now known or to be developed in the future, and amenable to use for such purposes.

As well, a subscriber may choose to save the video clip to the local storage facility of her mobile device, so that she may, for example, view, play, archive, share, broadcast, and the like, the video clip in the future, at such times and places, and upon any of a variety of devices, as she may choose.

Figure 22L:
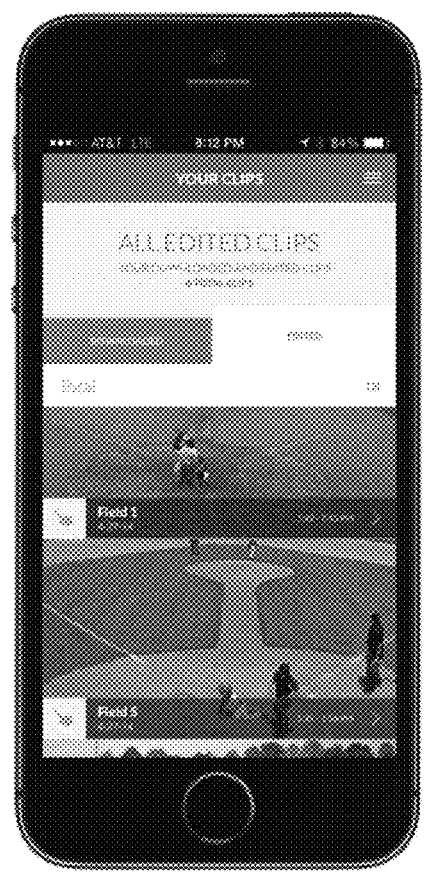
FIG. 22L depicts a subscriber mobile device running an application configured to interoperate with the sports-related video sharing system in accordance with an embodiment of the present disclosure, and further depicting a representative downloaded and edited clips screen thereof.

FIG. 22L depicts a representative downloaded and edited clips screen. For example, this screen may show a subscriber, on a first tab, all of the video clips that she has downloaded; as well as relevant statistics, such as the number of downloaded clips, the total time of such clips, and like information; as well as detailed information regarding each such clip, such as the venue, the field, the date, the recorded time interval, and like information. On a second tab, the subscriber may be shown all of the video clips that she has edited, and she may be shown additional information with regard to her edited clips, including, but not limited to, information such as was shown with regard to her downloaded clips.

Similarly, although FIGS. 6-22L depict a mobile experience attendant a particular operating system platform for use with a mobile device in the nature of a handset, it will be understood and appreciated that an appropriately scaled and configured variant of the handset experience could be provided for an ANDROID, WINDOWS, or other operating system for a mobile device.

Similarly, and more generally, although FIGS. 6-22L depict a mobile experience attendant a particular platform for use with a mobile device in the nature of a handset, such as a mobile smart phone, it will be understood and appreciated that an appropriately scaled and configured variant of the handset experience could be provided for a pad or tablet—type mobile device of any chosen operating system or platform.

In some embodiments, in order to enable the functionality of system 200 as has been described hereinabove, and particularly the administrative functionality thereof, core 204 may be provided with an appropriate system architecture, design, and corresponding data structure. The following provides details corresponding thereto.

Core 204 may be provided with an information architecture supporting navigation within core 204 and system 200. Accordingly, options may be provided enabling management of directors 202, and providing navigational containers for administration of the director-based system described hereinabove. Options enabling administration and management of organizations, venues, directors, cameras, camera schedules, sponsors, user accounts, and administrative accounts may be provided.

In order to administer and manage organizations, page displays and corresponding data structures may be provided to enable search functions for searching and listing organizations within system 200, and to enable creation of new organizations. When an organization is selected, page displays and corresponding data structures may be provided to enable display of status of an organization; to allow an administrator to activate, deactivate, update, and delete an organization; to display an editable profile of an organization; and to list venues assigned to an organization. Appropriate forms may be provided, including fields, buttons, and corresponding data structures for organization name and search submission, which may result in a tabular listing including organization creation and modification dates, links to organization status tabs, and the like. Forms may be provided for creation and modification of organizations, and may include fields comprising creation/modification dates, created by/modified by users, organization status, and the like. Forms may also be provided for creating and editing an organization profile, including associated images, descriptions, primary, secondary, and other contact information, notes, assigned/associated venues, venue links, and other relevant information.

In order to administer and manage venues, page displays and corresponding data structures may be provided to enable search functions for searching and listing venues within system 200, and to enable creation of new venues. When a venue is selected, page displays and corresponding data structures may be provided to enable display of status of a venue; to allow an administrator to activate, deactivate, update, and delete a venue; to display an editable profile of a venue; and to list directors assigned to a venue, to manage sponsors associated with a venue, and to provide relevant notes regarding a venue. Appropriate forms may be provided, including fields, buttons, and corresponding data structures for venue name and search submission, which may result in a tabular listing including venue creation and modification dates, links to venue status tabs, online and offline directors, and the like. Forms may be provided for creation, modification, and deletion of venues, and may include fields comprising creation/modification dates, created by/modified by users, organization and associated status, and the like. Forms may also be provided for creating and editing a venue profile, including associated images, descriptions, primary, secondary, and other contact information, notes, venue addresses, latitude and longitude, map URLs, map data "pinning" camera locations to maps of each venue, venue links, and other relevant information. Forms may also be provided for creating and editing directors assigned to a venue within system 200, and to enable creation of new directors, and modification and deletion of existing directors. As well, forms may be provided to enable searching, adding, modifying, and deleting sponsors associated with a venue, including sponsor identifying information, contact information, links, images, bumper content, and the like.

In order to administer and manage directors, page displays and corresponding data structures may be provided to enable search functions for searching and listing directors assigned to a venue within system 200, and to enable creation of new directors. When a director is selected, page displays and corresponding data structures may be provided to enable display of status of a director; to allow an administrator to activate, deactivate, update, and delete a director; to display an editable profile of a director; and to list cameras assigned to a director, to manage directors associated with a venue, and to provide relevant notes regarding a director. Appropriate forms may be provided, including fields, buttons, and corresponding data structures for director name and search submission, which may result in a tabular listing including director creation and modification dates, links to director status tabs, online and offline status indicators, associated IP address information, connected cameras, camera status, and the like. Forms may be provided for creation, modification, and deletion of directors, and may include fields comprising creation/modification dates, created by/modified by users, organization, venue, and associated status information, and the like. Forms may also be provided for creating and editing a director profile, including associated descriptions, camera information, organization and venue information, organization and venue links, and other relevant information.

In order to administer and manage cameras, page displays and corresponding data structures may be provided to enable search functions for searching and listing cameras assigned to a director within system 200, and to enable creation of new camera configurations, including global settings such as editable mobile and image quality, recording, and other settings for each video camera. When a camera is selected, page displays and corresponding data structures may be provided to enable display of status of a camera; to allow an administrator to activate, deactivate, update, and delete a camera; to display an editable profile of a camera; to display video settings for a camera, and to list videos currently assigned to a camera. Appropriate forms may be provided, including fields, buttons, and corresponding data structures for camera name and search submission, which may result in a tabular listing including director name information, links to camera status tabs, online and offline status indicators, associated IP address information, and the like. Forms may be provided for creation, modification, and deletion of cameras, and may include fields comprising creation/modification dates, created by/modified by users, organization, venue, director, and associated status information, and the like. Forms may also be provided for creating and editing a camera profile, including associated descriptions, camera information, camera description, model number, MAC address, IP address, camera schedule, assigned organization, venue, and director information, links, and other relevant information. Forms may further be provided for creating, editing, modifying, and deleting video settings of a camera, such as compression rates, bitrates, bitrate priority, resolution, speed, key frame interval, and similar settings associated with HD-capable cameras, as well as similar settings associated with mobile video settings of a camera.

In order to administer and manage schedules of cameras within system 200, page displays and corresponding data structures may be provided to enable search functions for searching and listing schedules assigned to a camera within system 200, and to enable creation of new schedules for each video camera. When a schedule is selected, page displays and corresponding data structures may be provided to enable display of a schedule associated with a camera; to allow an administrator to activate, deactivate, update, and delete a schedule, for example, by weekly schedule timeslots; to display an editable list of schedule overrides; and the like. Appropriate forms may be provided, including fields, buttons, and corresponding data structures for schedule name and search submission, which may result in a tabular listing including schedule name information, links to camera status tabs, online and offline status indicators, creation/modification dates, and the like. Forms may be provided for creation, modification, and deletion of schedules, and may include fields comprising creation/modification dates, created by/modified by users, organization, venue, director, camera, and associated status information, and the like. Forms may also be provided for adding weekly, daily, and/or override schedules and associated time slots, including days of week, start and end times, and the like.

In order to administer and manage accounts within system 200, page displays and corresponding data structures may be provided to enable search functions for searching and listing accounts assigned within system 200, and to enable creation of new accounts for subscribers and/or administrators. When an account is selected, page displays and corresponding data structures may be provided to enable display of an account associated with system 200; to allow an administrator to activate, deactivate, update, and delete an account; to display an editable list of account information and settings; to display an account profile, to display a list of video clips that a subscriber may have selected for archiving, and the like. Appropriate forms may be provided, including fields, buttons, and corresponding data structures for account name and search submission, which may result in a tabular listing including account owner name information, links to account status tabs, profile information, connected and disconnected status indicators, active and inactive status indicators, creation/modification dates, and the like. Forms may be provided for creation, modification, and deletion of accounts, and may include fields comprising creation/modification dates, created by/modified by users, associated status information, email addresses, passwords, profile information, notes, and the like.

In order to administer and manage sponsors within system 200, page displays and corresponding data structures may be provided to enable search functions for searching and listing sponsors assigned within system 200, and to enable creation of new sponsors and/or associated sponsor accounts. When a sponsor is selected, page displays and corresponding data structures may be provided to enable display of a sponsor associated with system 200; to allow an administrator to activate, deactivate, update, and delete a sponsor and/or sponsor account; to display an editable list of sponsor information and settings; to display sponsor profile, to display a list of bumper images or videos associated with a sponsor, and the like. Appropriate forms may be provided, including fields, buttons, and corresponding data structures for sponsor name and search submission, which may result in a tabular listing including sponsor name information, links to sponsor account status tabs, profile information, scheduled start and stop dates, a listing of video clips linked to the sponsor account, including associated venues, directors, and cameras, active and inactive status indicators, creation/modification dates, and the like. Forms may be provided for creation, modification, and deletion of sponsors, and may include fields comprising creation/modification dates, created by/modified by users, associated status information, contact information, email addresses, passwords, profile information, notes, and the like. Forms may be provided for adding, modifying, editing, and deleting bumpers and related bumper information to a sponsor account.

In accordance with a process of use of aforedescribed systems 100, 200, a subscriber may use her mobile or other network-connected computing device to find a venue wherein a remote-controlled camera has captured an event of interest. The subscriber may choose to watch the event from that network-connected computing device. Alternatively, or in addition, the subscriber may locate and download from a network-connected, computer enabled storage medium to a mobile or other network-connected computing device a selected video clip covering a time interval of interest occurring during the event. The subscriber may choose to edit the selected video clip upon the mobile or other network-connected computing device using functional operations such as zooming, trimming, panning, scrubbing, and like functions, such as have been described hereinabove. The subscriber may choose to save the selected video clip, in edited or unedited form, to the mobile or other network-connected computing device. Alternatively, or in addition, the subscriber may choose to share the selected video clip with others through any of a variety of network-enabled transmission, communication, storage, broadcast, upload/download, social media, social outlet, social networking, and/or like sites and services as may now be known or as may be developed in the future, and as are amenable to use for such purposes.

It will be recognized that alternative embodiments of system 100, 200 may be developed for use within alternative fields of use and endeavor. For example, suitably configured, system 100, 200 may be used within a surveillance, law enforcement, military, and/or security environment, and related fields of use. In such embodiments, system 100, 200 may provide relatively lower resolution video clips for periodic inspection and review. If a defined "event" should occur, system 100, 200 may provide relatively higher resolution video clips for more detailed review, for preservation of evidence, and for other purposes and uses consistent with such surveillance, law enforcement, military, and/or security environment, and related fields of use.

Having thus described exemplary embodiments of the subject matter of the present disclosure, it is noted that the within disclosures are exemplary, representative, and/or illustrative only and that various other alternatives, adaptations, and modifications may be made within the scope and spirit thereof. For example, it will be appreciated that other and further functionality, development, content, visual and system architecture, layout, and design, as well as other and further system scope, function, use, and application, may be provided without departing from the teachings set forth herein. Accordingly, the present subject matter is not limited to the specific embodiments as illustrated herein, but is only limited by the following claims.

What is claimed:

1. A system for providing sports-related video sharing services to subscribers of such services, the system comprising:
a plurality of venues, each said venue being geographically differentiated from each other said venue;
each said venue comprising at least one sport field;
each said sport field comprising at least one camera configured to record videographic data, each said camera for association of said videographic data with said sport field within said venue;
a memory configured to store videographic data recorded by said camera, the videographic data corresponding to a sporting event held on the sport field within the venue;
a director configured to manage and control said camera for recording mobile device-suitable compressed videographic data in, or spanning, predefined time intervals;
a network-accessible core configured to manage and control said director, said core further configured to provide subscriber access to said system via a subscriber mobile device, said core further configured to create low-bandwidth optimized "preview" videographic recordings suitable for viewing on a subscriber's configured mobile device, to manage recording schedules and compression settings for said camera, to establish the health of interconnected systems and hardware, and to notify an administrator in the event of a pre-defined error status or condition;
said mobile device configured to enable a subscriber to select a venue from said plurality of geographically differentiated venues, and then to select a sport field within said venue from said at least one sport field, and then to select a camera associated with said sport field within said venue from said at least one camera, and then to enable the subscriber to download, process, edit, and store, on and local-to said mobile device, at least a segment of the videographic data, said mobile device further configured to share the segment of the videographic data, or a link thereto, from said mobile device to a third-party over a computer implemented network.

2. The system of claim 1, wherein said core further controls said memory.

3. The system of claim 1, wherein said camera may be controlled by a remote operator.

4. The system of claim 1, wherein the segment of videographic data is stored to a memory of the mobile device by a subscriber of said system.

5. The system of claim 1, wherein editing of the segment of videographic data further comprises modification, by the subscriber, of the segment of videographic data, said modification local-to and upon the subscriber mobile device, the modification comprising one or more subscriber-selected and subscriber-directed features, said features selected from the group consisting of panning, zooming, cropping, and combining of a first segment of the videographic data with a second segment of the videographic data.

6. The system of claim 1, wherein editing of the segment of videographic data further comprises the addition to the segment of videographic data of one or more subscriber-selected, subscriber-directed, or subscriber-provided features, said features selected from the group consisting of textual annotations, graphic annotations, voice commentary, and music.

7. The system of claim 1, wherein said network-accessible core resides upon a web server.

8. The system of claim 1, wherein the subscriber-edited videographic data is shared over one or more social media channel and/or outlet.

9. The system of claim 8, wherein a process for sharing subscriber-edited videographic data comprises a link to a network-enabled resource.

10. The system of claim 1, wherein access to said system via a subscriber mobile device is accepted by said core via a network communications interface configured to link to a subscriber mobile device.

11. The system of claim 1, wherein access to said system is controlled by said core via a connection request initiated by an application residing on the subscriber mobile device.

12. A computer implemented system for providing video sharing services to subscribers of such services, the system comprising:
- a plurality of location, each said location being geographically differentiated from each other said location;
- each said location comprising as least one sub-location;
- each said sub-location comprising at least one camera to capture videographic data and store said videographic data in a memory, each said camera for association of said videographic data with said sub-location within said location;
- a director configured to manage and control said each said camera for recording mobile device-suitable compressed videographic data in, or spanning, predefined time intervals;
- a network-accessible core to manipulate, via computer processor, said videographic data in response to input in the form of one or more commands provided to said system by a subscriber mobile device;
- said core further configured to create low-bandwidth optimized "preview" videographic recordings suitable for viewing on a subscriber's configured mobile device, to manage recording schedules and compression settings for each said camera, to establish the health of interconnected systems and hardware, and to notify an administrator in the event of a pre-defined error status or condition;
- said core further configured to create an excerpted clip of predefined duration from said videographic data and to transmit said excerpted clip to the subscriber mobile device;
- said core further configured to inter-operate with an application, configured in association with the subscriber mobile device, to enable the subscriber to select a location from said plurality of geographically differentiated locations, and then to select a sub-location within said location from said at least one sub-location, and then to select a camera associated with said sub-location within said location from said at least one camera, and then to enable the subscriber to edit and store, on and local-to said mobile device, the excerpted clip upon the subscriber mobile device;
- the application further configured to provide said subscriber with network-enabled means to communicate said clip or, alternatively, an electronic location for accessing said clip, from said mobile device to one or more third-parties for viewing.

13. The system of claim 12, wherein said videographic data is received from a videographic camera located at an event venue.

14. The system of claim 12, wherein editing of the excerpted clip further comprises modification, by the subscriber, of the excerpted clip, said modification local-to and upon the subscriber mobile device, the modification comprising one or more subscriber-selected and subscriber-directed features, said features selected from the group consisting of panning, zooming, cropping, and combining of a first excerpted clip with a second excerpted clip.

15. The system of claim 12, wherein manipulation of said videographic data further comprises the step of adding to said excerpted clip one or more subscriber-selected, subscriber-directed, or subscriber-provided features, said features selected from the group consisting of textual annotations, graphic annotations, voice commentary, and music.

16. The system of claim 12, wherein said network-accessible core resides upon a web server.

17. The system of claim 12, wherein access to said system is controlled by said core via a connection request initiated by an application residing on the subscriber mobile device.

18. A computer-implemented system for providing sports-related video sharing services to subscribers of such services, the system comprising:
- a plurality of sport venues, each said sport venue being geographically differentiated from each other said sport venue;
- each said sport venue comprising at least one sport field;
- each said sport field comprising at least one video camera associated therewith and controlled by a director, said director for recording mobile device-suitable compressed videographic data in, or spanning, predefined time intervals;
- a memory configured to receive and store videographic data from said camera, said data corresponding to a sporting event held at said sport venue;
- a network-accessible video data server comprising a core configured to inter-operate with said director and said video camera, and to manipulate said videographic data, at least in part, by an input in the form of one or more commands provided by a remote subscriber to said system initiated via a subscriber mobile device, in order to create a video clip from said videographic data, and to transmit said video clip to the subscriber mobile device, said core further configured to create low-bandwidth optimized "preview" videographic recordings suitable for viewing on a subscriber's configured mobile device, to manage recording schedules and compression settings for said camera, to establish the health of interconnected systems and hardware, and to notify an administrator in the event of a pre-defined error status or condition;
- said subscriber mobile device configured to enable a subscriber to select a sport venue from said plurality of geographically differentiated sport venues, and then to select a sport field within said sport venue from said at least one sport field, and then to select a camera associated with said sport field within said sport venue from said at least one camera, and then to enable the subscriber to store and edit, on and local-to said mobile device, said video clip within a memory upon the subscriber mobile device;
- network enabled means for allowing the subscriber to distribute said video clip or, alternatively, an electronic location for accessing said video clip, from said mobile device to one or more third-parties for viewing.

19. The system of claim 18, wherein editing of said video clip further comprises the addition to said video clip of one or more subscriber-selected and subscriber-directed features, said features selected from the group consisting of panning, zooming, cropping, combining of a first video clip with a second video clip, textual annotations, graphic annotations, voice commentary, and music.

20. The system of claim 18, wherein said input in the form of one or more commands provided by a remote subscriber of said system is accepted by said core via a network communications interface configured to link to the subscriber mobile device.

* * * * *